United States Patent
Wang

(10) Patent No.: US 8,935,561 B2
(45) Date of Patent: Jan. 13, 2015

(54) PROGRESSIVE NETWORK RECOVERY

(75) Inventor: Jianping Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 282 days.

(21) Appl. No.: 13/403,922

(22) Filed: Feb. 23, 2012

(65) Prior Publication Data

US 2013/0227334 A1    Aug. 29, 2013

(51) Int. Cl.
*G06F 11/00* (2006.01)

(52) U.S. Cl.
USPC .......................................................... 714/4.1

(58) Field of Classification Search
CPC .......... H04L 45/28; H04L 45/22; H04L 12/04
USPC .......................................................... 714/4.1
See application file for complete search history.

(56) References Cited

U.S. PATENT DOCUMENTS

| | | | | |
|---|---|---|---|---|
| 4,677,616 | A * | 6/1987 | Franklin | 370/423 |
| 5,086,816 | A * | 2/1992 | Mieth | 141/83 |
| 6,038,212 | A * | 3/2000 | Galand et al. | 370/216 |
| 6,134,671 | A * | 10/2000 | Commerford et al. | 714/4.3 |
| 6,141,319 | A * | 10/2000 | Dighe et al. | 370/218 |
| 6,153,525 | A * | 11/2000 | Hendricks et al. | 438/692 |
| 6,167,025 | A * | 12/2000 | Hsing et al. | 370/216 |
| 6,496,941 | B1 * | 12/2002 | Segal et al. | 714/4.2 |
| 6,606,529 | B1 * | 8/2003 | Crowder et al. | 700/100 |
| 6,862,263 | B1 * | 3/2005 | Simmons | 370/217 |
| 6,947,346 | B2 * | 9/2005 | Shore et al. | 365/222 |
| 7,383,191 | B1 * | 6/2008 | Herring et al. | 705/1.1 |
| 7,508,763 | B2 * | 3/2009 | Lee | 370/235 |
| 7,551,550 | B2 * | 6/2009 | Sinha | 370/217 |
| 7,961,638 | B2 * | 6/2011 | Porat | 370/252 |
| 8,130,637 | B2 * | 3/2012 | Owens et al. | 370/218 |
| 8,375,244 | B2 * | 2/2013 | Bobak et al. | 714/3 |
| 2009/0135717 | A1 * | 5/2009 | Kamal et al. | 370/225 |
| 2011/0075662 | A1 * | 3/2011 | Rathunde et al. | 370/389 |
| 2011/0165431 | A1 * | 7/2011 | Inoue et al. | 428/599 |
| 2011/0280580 | A1 * | 11/2011 | Wexler | 398/79 |
| 2012/0124413 | A1 * | 5/2012 | Bauer et al. | 714/4.11 |
| 2012/0281523 | A1 * | 11/2012 | Huber et al. | 370/217 |

(Continued)

OTHER PUBLICATIONS

Ramamurthy et al., "Survivable WDM mesh networks", IEEE/OSA Journal of Lightwave Technology, vol. 21, No. 4, pp. 870-883, 2003.

(Continued)

*Primary Examiner* — Amine Riad
(74) *Attorney, Agent, or Firm* — Amin, Turocy & Watson, LLP

(57) ABSTRACT

Technologies are generally described for systems and methods effective to schedule repair (e.g., allocate repair resources, determine a repair sequence, etc.) of a system effected by a large-scale failure caused by a natural disaster, malicious attack, faulty components, or the like. In an example, the system can generate a schedule that indicates amounts of repair resources allocated for repair of specific components of a disrupted system as well as a time or sequence in which the components are to be repaired. The schedule, in some instance, can operate to maximize an amount of restoration, at each stage of a recovery process, relative to the characteristic of the disrupted system. For example, with a communications network as the disrupted system, the schedule can maximize the amount of total traffic flow capacity recovered after respective steps of the recovery process.

20 Claims, 17 Drawing Sheets

(56) References Cited

U.S. PATENT DOCUMENTS

2013/0124753 A1* 5/2013 Ansari et al. ............... 709/235
2013/0212422 A1* 8/2013 Bauer et al. ............... 714/4.1

OTHER PUBLICATIONS

Choi et al., "Loopback recovery from double-link failures in optical mesh networks", IEEE/ACM Trans. Networking, vol. 12, No. 6, pp. 1119-1130, Dec. 2004.

Grover et al., "New options and insights for survivable transport networks", IEEE Communication Magazine, vol. 40, No. 1, pp. 34-41, Jan. 2002.

Schupke et al., "Optimal configuration of p-cycle in WDM networks", in Proc. IEEE Int. Conf. Communications (ICC'2002), New York, vol. 5, pp. 2761-2765, Apr. 2002.

Wang et al., "Dual-homing based scalable partial multicast protection", IEEE Transactions on Computers, vol. 55, No. 9, pp. 1130-1141, 2006.

Sen et al., "Region-based connectivity—A new paradigm for design of fault-tolerant networks", IEEE International Conference on High Performance Switching and Routing (HPSR), Paris, France, Jun. 2009.

Neumayer et al., "Assessing the vulnerability of the fiber infrastructure to disasters", in proceedings of IEEE Infocom, Apr. 2009.

Matisziw et al., "Modeling s-t path availability to support disaster vulnerability assessment of network infrastructure", Computer & Operations Research, vol. 36, No. 1, pp. 16-26, Jan. 2009.

Smith et al., "Contigency/disaster recovery planning for transmission systems of the defense information system network", IEEE JSAC, vol. 12, No. 1, pp. 13-22, 1994.

Horie et al., "A new method of proactive recovery mechanism for large-scale network failures", International Conference on Advanced Information Networking and Applications, 2009.

Papp et al., "Repair strategies on the operation of MPLS routing", in Recent Advances in Modeling and Simulation Tools for Communication Networks and Services, chapter 16, pp. 319-330, Springer, 2007.

Yu et al., "A new era for crew recovery at continental airlines", Interfaces, vol. 33, No. 1, pp. 5-22, 2003.

Yu et al., "Disruption Management: Framework, Models and Applications", World Scientific Publishing, Singapore, 2004.

Israeli et al., "Shortest-path network interdiction", Networks, vol. 40, No. 2, pp. 97-111, 2002.

R.K. Wood, "Deterministic network interdiction", Mathematical and Computer Modeling, vol. 17, No. 2, pp. 1-18, 1993.

Matisziw et al., "Strategic Network Restoration", Netw Spat Econ (2010) 10:345-361.

Wang et al., "On Progressive Network Recovery after a Major Disruption", INFOCOM, 2011 Proceedings IEEE, Apr. 10-15, 2011, pp. 1925-1933.

Nurre et al., "Restoring Infrastructure Systems: An Integrated Network Design and Scheduling Problem", Sep. 30, 2010, http://homepages.rpi.edu/~nurres/RIS.pdf.

* cited by examiner

PROGRESSIVE NETWORK RECOVERY

TECHNICAL FIELD

The subject disclosure relates generally to progressive network recovery and, in particular, scheduling a progressive network recovery process as a function of available resources, recovery conditions, system state, a set of weights, etc.

BACKGROUND

As various systems, such as communications networks, computing networks, transportation networks, etc., grow in size and complexity, a potential for large-scale failures also increases. Large-scale failures can be measured in terms of disrupted components or affected users and can be caused by software errors, system configuration errors, improper maintenance, malicious attacks, natural disasters (e.g., tsunamis, earthquakes, hurricanes, tornadoes, volcanic eruptions, etc.), and so on. Such failures can result in significant economic and social impact on governments, populations, and businesses. As such, recovery from large-scale failures is a principal focus. In particular, for failures caused from natural disasters, effective recovery can aid rescue operations and, accordingly, have life-or-death consequences.

Conventional attempts to design survivable systems, e.g., networks capable of maintaining function through major incidents, have focused on implementing redundancies. For example, techniques to survive a single-link failure, e.g., failure of one link of a network, can include dedicated and/or shared link protection and restoration, p-cycle protection, and dual-homing protection. While modeling of large-scale failures and identifying vital infrastructure facilities to access vulnerability of a system to a disaster, conventional techniques regarding recovery of systems from large-scale failures focus on proactive provisioning of backup paths. Accordingly, conventional system management approaches have focused on proactively increasing resilience of a system to disruptions. However, little attention has been given to rebuilding or recovering a damaged system through repair of failed components after large-scale failures.

The above-described deficiencies of conventional approaches to system robustness to large-scale failures are merely intended to provide an overview of some of the problems of conventional approaches and techniques, and are not intended to be exhaustive. Other problems with conventional systems and techniques, and corresponding benefits of the various non-limiting embodiments described herein may become further apparent upon review of the following description.

SUMMARY

In various, non-limiting embodiments, systems and methods are provided for scheduling repair (e.g., allocating repair resources, determining a repair sequence, etc.) of a system affected by a large-scale failure caused by a natural disaster, malicious attack, faulty components, or the like. In an example, the system can generate a schedule that indicates amounts of repair resources allocated for repair of specific components of a disrupted system as well as a time or sequence in which the components are to be repaired. The schedule, in some instance, can operate to maximize an amount of restoration, at each stage of a recovery process, relative to the characteristic of the disrupted system. For example, with a communications network as an example disrupted system, the schedule can maximize the amount of total traffic flow capacity recovered after respective steps of the recovery process.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

Various non-limiting embodiments are further described with reference to the accompanying drawings in which.

DETAILED DESCRIPTION

Overview

Figure 1:
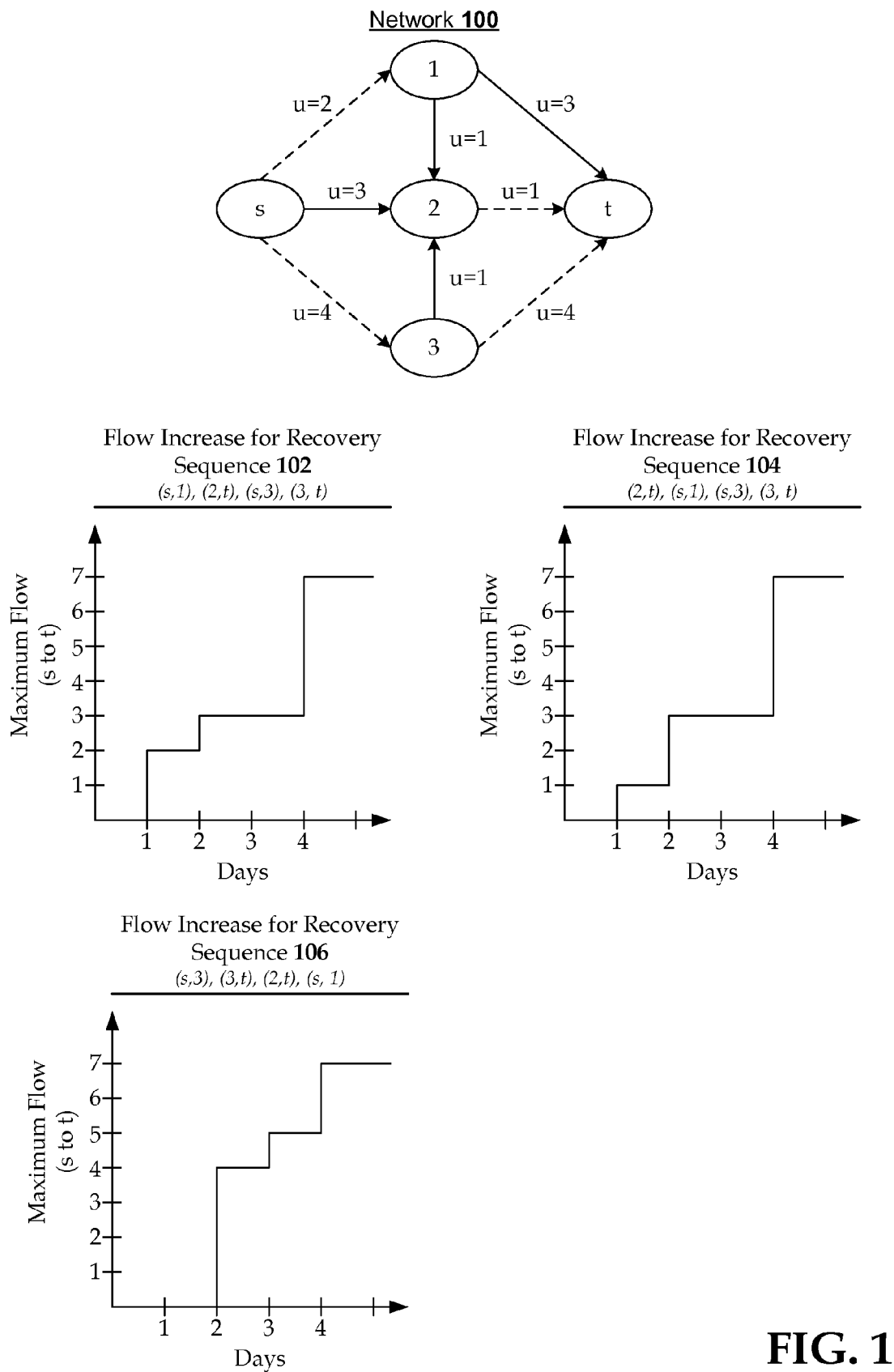
FIG. 1 illustrates an example disrupted network and an impact of various recovery sequences on restoration of the disrupted network in accordance with one or more embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

As discussed above, conventional approaches to handling large-scale failures of systems, due to, for example, hardware/software errors, improper maintenance, malicious attacks, natural disasters, etc., have focused on avoidance of such large-scale failures. For example, conventional approaches attempt to increase resilience to large-scale failure causing events through implementation of redundancies and augmentation of critical components.

In various, non-limiting embodiments, a progressive recovery system is provided that enables determination of a recovery process in view of potentially scarce repair resources. Typically, for a system affected by a large-scale failure, repairing failed components of the system takes time and resources such that system recovery does not occur as a one-step operation. Rather, in some instances, recovery involves multiple stages in which, during respective stages, repair resources available during the stage are allocated to repair some of the failed components to arrive at a partially recovered system. A partially recovered system can provide services even though such services may be at a degraded level.

In the case of a communications network, partial recovery can facilitate disaster relief missions by providing communication capabilities not previously available. Further to this example of a communications network, it is appreciated that the larger the amount of network traffic capacity which can be recovered and the quicker the communications network can be recovered to a pre-failure capacity, the better. Speed and effectiveness of recovery can depend in part on a recovery process or sequence followed. For instance, different recovery processes can restore failed components in different orders and result in different amounts of network capacity increases after respective steps.

By way of example, FIG. 1 illustrates an example disrupted network and an impact of various recovery sequences on restoration of the disrupted network in accordance with one or more embodiments. As shown in FIG. 1, a network 100 can include a multiple number of network nodes respectively interconnected by a multiple number of network links or arcs. To facilitate explanation of an aspect, network 100 includes directed network links or arcs showing traffic flow between a respective pair of network nodes traversing in a single direction. However, as described in greater detail below, it is to be appreciated that bidirectional traffic flow is comprehended which can be shown as undirected network links or as two separate directional links with opposite directions.

According to one embodiment, traffic flow can be viewed in terms of a flow from a source node, e.g., node s in FIG. 1, to a destination node, e.g., node t in FIG. 1. Traffic flow capacities, u, of respective network links are shown in FIG. 1. As evident from network 100 shown in FIG. 1, a maximum traffic flow provided by network 100, from node s to node t, is 7 units. To explain further, along the path of node s to node 1 to node t, 2 units are supported. While the link connecting node 1 to node t supports 3 units, a maximum of 2 units between node s and node t via node 1 is possible since the link connecting node s to node 1 supports only 2 units.

The maximum traffic flow between node s and node t can be summation of maximum traffic flows of individual paths connecting node s to node t. For example, the path of node s to node 1 to node t has a maximum flow of 2 units. The path of node s to node 1 to node 2 to node t has a maximum flow of 1 unit. The path of node s to node 2 to node t has a maximum flow of 1 unit, the path of node s to node 3 to node 2 to node also has a maximum flow of 1 unit, and the path of node s to node 3 to node has a maximum flow 4 units. However, as several paths from node s to node t overlap, a total flow on respective overlapping paths cannot exceed a capacity of the overlapping portions of the paths. Thus, a total flow of 2 units on all paths containing the link from node s to node 1, a total flow of 1 unit is possible on all paths containing the link from node s to node 2, and a total flow of 4 units if possible across all paths containing the link from node s to node 3. Accordingly, the maximum flow between node s and node t is 7 units.

FIG. 1 depicts a disruption of network 100 in which disrupted network links are shown as dashed lines. In accordance with this example, disrupted network links do not have partial capacity. However, as described in greater detailed below, disrupted network links can retain some capacity but less than a designed or full capacity. Thus, after the disruption, the maximum flow from node s to node t drops to zero.

Further to this example, suppose it takes one day and some resources to repair a disrupted network link such that it takes four days to fully recover network 100. Different recovery sequences, however, recover different amounts of traffic flow between node s and node t at the end of each step. FIG. 1 depicts flow increases for various recovery sequences. For a recovery sequence 102, in which the link between node s and node 1 is repaired first, followed by the link between node 2 and node t, the link between node s and node 3, and finally the link between node 3 and node t, the flow increase after each repair is shown. For instance, at the end of day 1, e.g., after repair of the link between node s and node 1, 2 units of traffic flow capacity are recovered. After 2 days, 3 units have been recovered, and after 4 days, full capacity is restored.

In a recovery sequence 104, the link between node 2 and node t is repaired first, followed by the link between node s and node 1, the link between node s and node 3, and finally the link between node 3 and node t. Employing recovery sequence 104, after the first day, 1 unit is recovered, 3 units are recovered after the second day, and fully capacity (7 units) is restored after the fourth day. According to a recovery sequence 106, also shown in FIG. 1, the link between node s and node 3 is repaired first, followed by the link between node 3 and node t, the link between node 2 and node t, and finally the link between node s and node 1. Following recovery sequence 106, no units of capacity are recovered after the first day, but 4 units are restored by the end of the second day. After the third day, according to recovery sequence 106, 5 units are recovered, and full capacity is restored by the end of the fourth day.

Based upon the foregoing examples, recovery sequence 102 supports a higher capacity after day one than recovery sequence 104. Recovery sequence 106, while not having positive flow until the end of day two, supports a larger flow than either of recovery sequences 102 or 104 after the second day. Accordingly, one sequence, e.g., recovery sequence 102, can be preferred when an objective is to support a small flow as soon as possible while another sequence, e.g., recovery sequence 106, can be preferred when a higher flow demand needs support after a predetermined time period, e.g., two days.

FIG. 1 illustrates that different recovery processes generate different results, have disparate impacts, and are beneficial for different scenarios. However, planning, evaluating, and comparing recovery processes is a nontrivial exercise since nodes, in addition to links, can fail, an amount of repair resources available can vary with time, and different components (e.g., nodes, links, etc.) can requires different amounts of resource to repair. In addition, network links can partially fail such that some amount of capacity remains after disruption. Moreover, components can be partially repaired so that some amount of resources (e.g., less than a requirement for complete repair) can restore some capability of the components.

Figure 2:
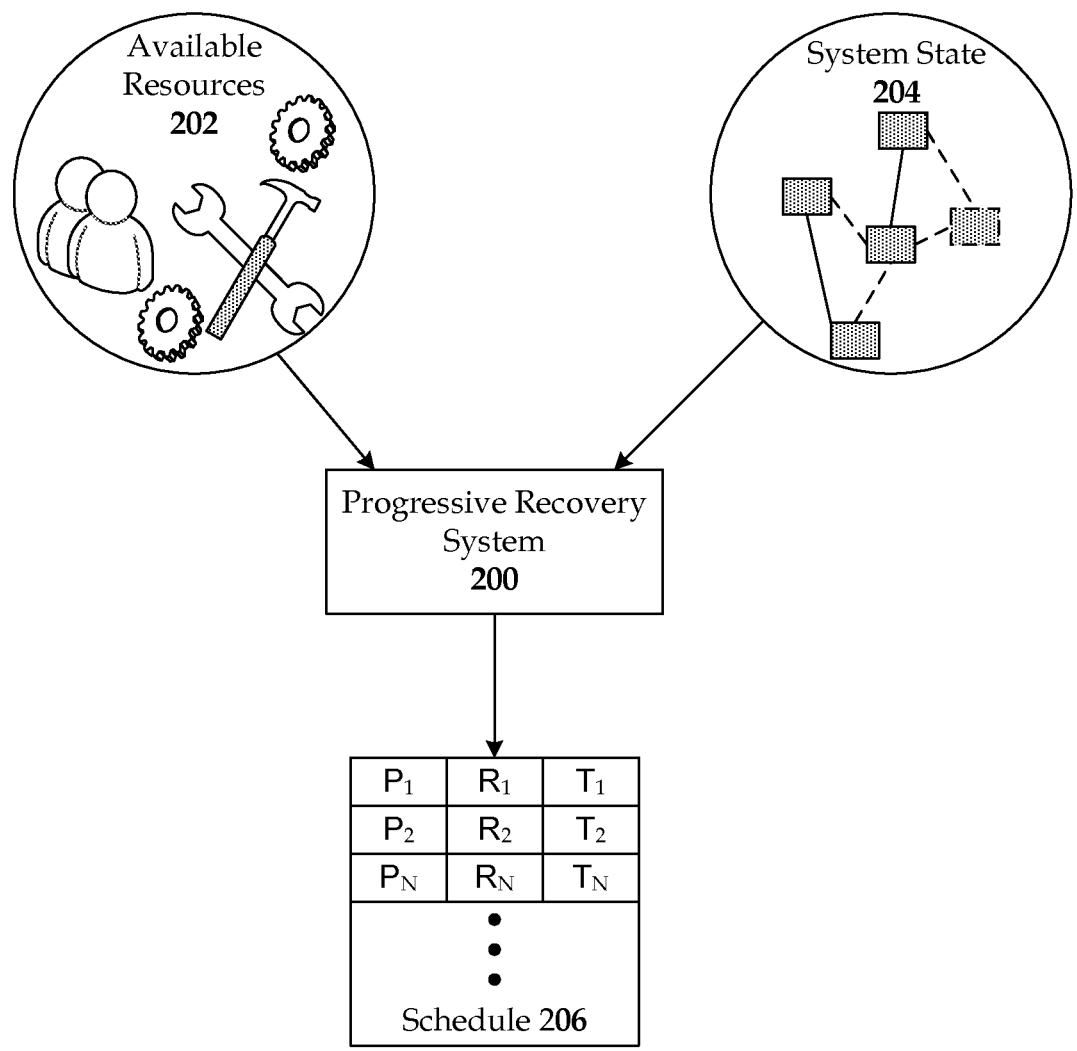
FIG. 2 is a block diagram illustrating an example, non-limiting embodiment of a progressive recovery system for scheduling a repair process for a disrupted system.

FIG. 2 shows a block diagram illustrating an example, non-limiting embodiment of a progressive recovery system for scheduling a recovery process for a disrupted system. As shown in FIG. 2, a progressive recovery system 200 is provided to generate a schedule 206, e.g., a repair schedule, as a function of available resources 202 and a system state 204.

Available resources 202 can include manpower resources such as personnel, equipment resources such as tools and machines, and component resources such as spare parts, replacement parts, etc. In an example, some resources of available resources 202 can be exhaustible such that, once used, the resources may not be reclaimable. For instance, replacement parts, once used, are no longer available for repair of other components and thus are deemed exhaustible. Other resources of available resources 202, however, are inexhaustible and can be redeployed time and time again to repair multiple components. Equipment resources and manpower resources can be redeployed and are, thus, examples of inexhaustible resources.

System state 204 can include information specifying current metrics, conditions, capabilities, and/or capacities of components of a respective system. In one specific, non-limiting example, as shown in FIG. 2, the system can be a network system (e.g., a communications network, a computing network, a transportation network, etc.) and system state 204 can indicate conditions of each node and each link of the system. In this regard, system state 204 can convey to progressive recovery system 200 which portions of the system are disrupted, e.g., degraded from normal operating ranges. While the example of a disrupted system which can be modeled as a network structure is employed herein to facilitate description of various embodiments, it is to be appreciated that other systems, not modeled as network structures, which are disrupted can benefit from progressive recovery implemented by schedules generated by progressive recovery system 200.

Schedule 206, generated by progressive recovery system based on available resources 202 and system state 204, can specify portions of the system selected for repair, respective amounts of resources allocated for the repair of selected portions of the system, and respective times at which repairs for respective portions are to occur, as shown in FIG. 2. According to an example, the times included in schedule 206 can be specific times (e.g., Monday at 0730), specific time ranges (Tuesday from 0800 to 1200), specific dates (e.g., May 5, 2011), or a specific stage of the recovery process (e.g., stage 3). Resources indicated in schedule 206 can include specific resource allocations (e.g., repair team #2), or general resource allocations (e.g., one team, etc.).

FIG. 2 illustrates a general context of a progressive recovery system, which can be configured and employed according to one or more embodiments described herein. For instance, in one example, non-limiting embodiment, the progressive recovery system is configured to model a disrupted system and repair procedures and to generate a recovery process (e.g., a schedule or sequence) based upon a characteristic of the system, a recovery condition, and available repair resources. For instance, the recovery condition can indicate an amount of capacity desired to be restored after a predetermined time period (e.g., 2 days as described above). In another example, the recovery condition can specify that at least a small amount of capacity is to be restored immediately. Further still, the recovery condition can fine tune an importance of individual components of the disrupted system over time such that respective weights given to respective components vary over time to enable repair priorities to shift.

In yet another example, the progressive recovery system can generate a schedule that indicates amounts of repair resources allocated for repair of specific components of the disrupted system as well as a time or sequence in which the components are to be repaired. The schedule, in some instance, can operate to maximize an amount of restoration, at each stage of the recovery process, relative to the characteristic of the system. For example, with a communications network as the disrupted system, the schedule can maximize the amount of total traffic flow capacity recovered after respective steps of the recovery process.

In one embodiment, a method is described herein that includes identifying a subset of network links, of a set of network links of a communications network, having reduced capacity due to impairment, determining a set of resources available, for allocation at a given time, for repair of the subset of network links, and scheduling the set of resources for the repair of the subset of network links in an order based on a characteristic of the communications network and a recovery condition as a function of the characteristic. According to an example, scheduling can further include generating a schedule for allocating resources, from the set of resources, to facilitate repair of network links, from the subset of network links, to recuperate a predetermined capacity of the communications network within a predetermined time period. In another example, scheduling can include determining a schedule for allocating resources, from the set of resources, to facilitate repair of network links, from the subset of network links to recover a maximal or substantially maximal amount of capacity of the communications network within a predetermined time period.

In addition, the method can include determining, for a network link of the subset of network links, a repair cost that represents an amount of resources from the set of resources to recuperate a predetermined capacity of the network link, determining, based on the predetermined capacity of the network link, an amount of total capacity of the communications network regained by recuperating the predetermined capacity of the network link, and determining, based on the repair cost and the amount of the total capacity regained, a utility gain of the network link representing an amount of capacity recovered per unit of resource. Further to this example, scheduling can include assigning higher priority to network links from the subset of network links having a higher utility gain.

In another embodiment, a system, described herein, includes a fault detection module configured to identify a disruption of a computing network, wherein the disruption results in reduced traffic flow capacity for a set of network nodes and a set of network links of the computing network, and a recovery module configured to generate a repair schedule that specifies an order of allocation of a set of repair resources among the set of network nodes and the set of network links to facilitate progressive recovery of the computing network from the disruption based on a condition relative to a characteristic of the computing network. According to an example, the recovery module is further configured to segment network recovery, as specified in the repair schedule, into a plurality of stages, wherein the repair schedule indicates, for a respective stage, which nodes from the set of network nodes and which links from the set of network links are respectively scheduled for repair, and an amount of resources from the set of repair resources respectively allocated to the nodes and the links scheduled for the repair. For instance, the recovery module is further configured to select the nodes and the links for the repair during the respective stage and the amount of resources allocated to the nodes and the links in accordance with an optimization condition. The optimization condition can specify a maximization of a total traffic flow capacity of the computing network. Moreover, the repair schedule represents an optimum allocation to achieve the condition relative to the characteristic of the communication network.

According to further examples, the set of repair resources comprise at least one of manpower, equipment, or parts available at a particular time. The condition relative to the characteristic of the computing network, in another example, specifies a predetermined amount of traffic flow capacity to be recovered within a predetermined time period. In yet another example, the condition relative to the characteristic of the computing network specifies a predetermined time period within which a maximum or substantially maximum amount of traffic flow capacity is to be recovered.

In an additional embodiment, a computer-readable storage medium is described having stored thereon computer-executable instructions that, in response to execution, cause a computing device to perform operations that include segmenting a network recovery process for a network into a plurality of stages respectively associated with a respective set of repair resources available for allocation during respective stages of the plurality of stages, and recursively selecting, for the respective stages, respective network paths from a set of disrupted network paths for repair until the respective set of repair resources available for allocation is exhausted, wherein the recursively selecting the respective network paths comprises identifying the respective network paths from the set of disrupted network paths which, in response to repair of the respective network paths, increase a total weighted traffic flow capacity of the network after respective conclusions of the respective stages. The operations can further include identifying the set of disrupted network paths based upon a set of designed capacities respectively corresponding to the set of disrupted network paths and a set of measured capacities respectively corresponding to the set of disrupted network paths. Further, the operations can also include determining the total weighted traffic flow capacity as a function of, a set of weights assigned to respective network paths of the set of disrupted network paths, wherein respective weights of the set of weights correspond to the respective stages, and a set of traffic flow capacities assigned to respective network paths, wherein respective traffic flow capacities of the set of traffic flow capacities correspond to the respective stages.

According to one or more examples, recursively selecting can include selecting the respective network paths starting from a first stage, in time, of the plurality of stages and ending with a last stage, in time, of the plurality of stages, selecting the respective network paths starting from a last stage, in time, of the plurality of stages and ending with a first stage, in time, of the plurality of stages, or selecting the respective network paths starting from an intermediate stage, in time, of the plurality of stages to a first stage, in time, of the plurality of stages and from the intermediate stage, in time, of the plurality of stages to a last stage, in time, of the plurality of stages. In a further example, identifying the respective network paths includes identifying the respective network paths that maximally increases the total weighted traffic flow capacity of the network after the respective conclusions of the respective stages.

In yet another embodiment, a system, described herein, includes means for detecting a set of network paths, of a communications network, suffering reduced traffic flow capacity due to a disruption, means for determining, for a network path of the set of network paths, an amount of overall traffic flow capacity of the communications network recoverable through repair of the network path and an amount of repair resources implicated by the repair the network path, and means for identifying a subset of network paths, from the set of network paths, for repair based upon the amount of overall traffic flow capacity recoverable, the amount of repair resources implicated, and an overall amount of repair resources available for allocation including means for increasing a total traffic flow capacity of the communications network in response to the repair of the subset of network paths.

In an example, the system can also include means for recursively selecting subsets of network paths, from the set of network paths, over a plurality of stages until a recovery condition is satisfied.

Still another embodiment described herein is a method that includes employing at least one component of at least one computing device to perform operations. The operations can include segmenting a network recovery process for a network into a plurality of stages respectively associated with a respective set of repair resources available for allocation during respective stages of the plurality of stages, and recursively selecting, for the respective stages, respective network paths from a set of disrupted network paths for repair until the respective set of repair resources available for allocation is exhausted, wherein the recursively selecting the respective network paths comprises identifying the respective network paths from the set of disrupted network paths and, in response to the repair of the respective network paths, increasing a total weighted traffic flow capacity of the network after respective conclusions of the respective stages.

In an example, the operations can also include determining the set of disrupted network paths based on a set of predicted capacities respectively corresponding to the respective network paths of the set of disrupted network paths and a set of actual capacities respectively corresponding to the respective network paths of the set of disrupted network paths. In another example, the operations include determining a predetermined number of stages, wherein the recursively selecting of the network paths further comprises identifying the respective network paths from the set of disrupted network paths for repair over the predetermined number of stages and maximizing the total weighted traffic flow capacity of the network, or determining a predetermined overall traffic flow capacity, wherein the recursively selecting further comprises identifying the respective network paths from the set of disrupted network paths for repair over a minimized number of stages to reach the predetermined overall traffic flow capacity.

In yet another example, the operations can include receiving a set of weights associated with respective network paths of the set of disrupted network paths, wherein respective weights of the set of weights correspond to the respective stages of the plurality of stages, and determining a set of traffic flow capacities associated with the respective network paths, wherein respective traffic flow capacities of the set of traffic flow capacities correspond to the respective stages of the plurality of stages. Further to this example, the operations can include determining the total weighted traffic flow capacity of the network as a function of the set of weights associated with the respective network paths and the set of traffic flow capacities associated with the respective network paths.

Herein, an overview of some of the embodiments for providing progressive system recovery after a major disruption has been presented above. As a roadmap for what follows next, various example, non-limiting embodiments and features for a progressive recovery system are described in more detail. Then, a non-limiting implementation is given for a computing environment in which such embodiments and/or features can be implemented.

Progressive System Recovery

Figure 3:
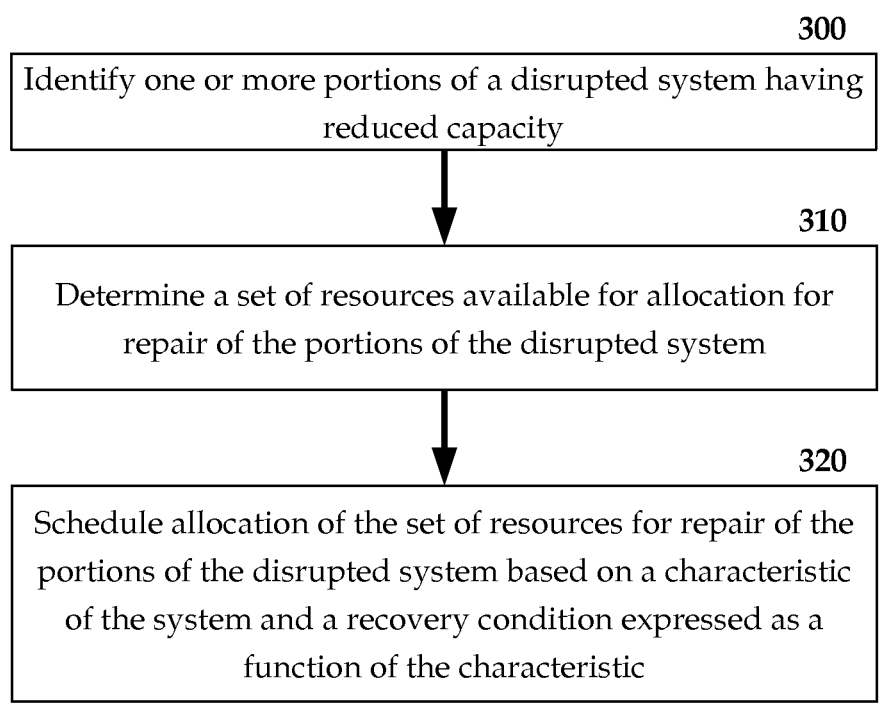
FIG. 3 is a flow diagram illustrating an example, non-limiting embodiment for scheduling repair of portions of a disrupted system based on a set of available resources and a predetermined recovery condition.

As mentioned above, in various embodiments, a system is provided which is configured to schedule repair (e.g., allocate repair resources, determine a repair sequence, etc.) of a system effected by a large-scale failure caused by a natural disaster, malicious attack, faulty components, or the like. With respect to one or more non-limiting ways to schedule progressive recovery of a disrupted system as described above, FIG. 3 shows a flow diagram illustrating an example, non-limiting embodiment for scheduling repair of portions of a disrupted system based on a set of available resources and a predetermined recovery condition. As mentioned previously, an example utilized throughout this description is of a disrupted system characterized as a network structure. Such systems can include communications networks, transportation networks, circuit networks, supercomputing clusters, computing networks, or the like. However, it is to be appreciated that embodiments described herein are not limited to the specific example of networked systems and that the embodiments described herein are comprehended to function with other systems such as devices, machines, etc.

At 300, one or more portions (e.g., one or more nodes, one or more links, etc.) of a disrupted system, e.g., a communications network, a computing network, a transportation network, etc., are identified. The portions identified include sections of the disrupted system having reduced capacity. At 310, a set of resources is determined. The set of resources include resources available for allocation for repair of the one or more portions of the disrupted system. At 320, allocation of the set of resources is scheduled based on a characteristic of the disrupted system and a recovery condition expressed as a function of the characteristic.

In one example, the recovery condition can specify an amount of capability, expressed in terms of the characteristic, to be recovered within a predetermined time period. In another example, the recovery condition can specify a predetermined amount of capability to be restored as quickly as possible. For instance, restoration of a minimum amount of capability of the system can be desired immediately such that the system can resume basic functions, albeit in a degraded fashion. In the case of a multiple stage recovery process, described in detail below, the recovery condition can specify sub-objectives. By way of example, the sub-objectives can specify, for a respective stage, that the amount of capability regained, at the end of the stage, represents a substantially maximum amount possible. It is to be appreciated however, that the sub-objective example given above can also represent a primary objective provided by the recovery condition. Accordingly, the scheduled allocation of resources can be determined such that primary objectives are fulfilled while satisfying one or more sub-objectives as well.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
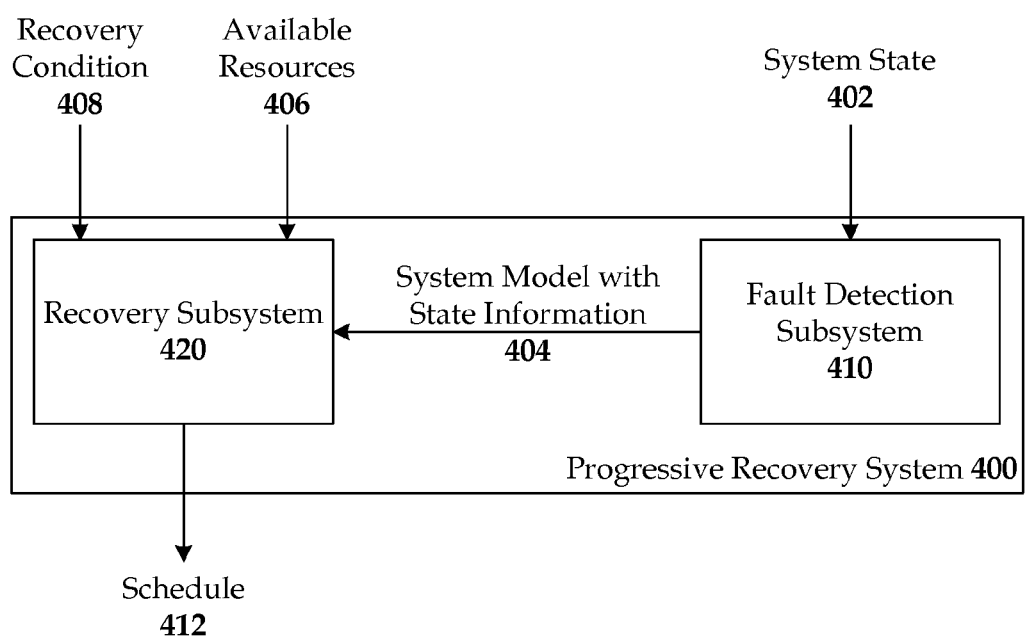
FIG. 4 illustrates a block diagram of an example, non-limiting embodiment for a progressive recovery system that utilizes a model with state information to generate a repair schedule.

FIG. 4 illustrates a block diagram of an example, non-limiting embodiment for a progressive recovery system that utilizes a model with state information to generate a repair schedule. As shown in FIG. 4, a progressive recovery system 400 is depicted that includes a fault detection subsystem 410 configured to identify a disruption of a system (e.g., computing network, communications network, etc.), in which the disruption results in reduced capacity (e.g., traffic flow capacity) for a set of nodes and a set of links of the system. More particularly, fault detection subsystem 410 is configured to generate a system model 404 that includes state information derived from a received system state 402.

In a specific, non-limiting example, system model 404 can be a directed network model G(N, E) where N represents a set of nodes of a network and E represents a set of links (e.g., edges or arcs) of the network. Each link, $(i,j) \in E$, has a respective normal operating capacity, $u_{ij}$. When a disruption of a the system occurs, a capacity of a damaged link, $(i,j) \in E$, is reduced to $v_{ij}$ after the disruption, where $0 \leq v_{ij} < u_{ij}$. The reduced capacities, $v_{ij}$, can be determined from system state 402 and incorporated into system model 404 generated by fault detection subsystem 410. The foregoing example for system model 404 describes a directed network model with directed links. It is to be appreciated, however, that the directed network model can be expanded to accommodate undirected links and disrupted nodes.

Figure 5:
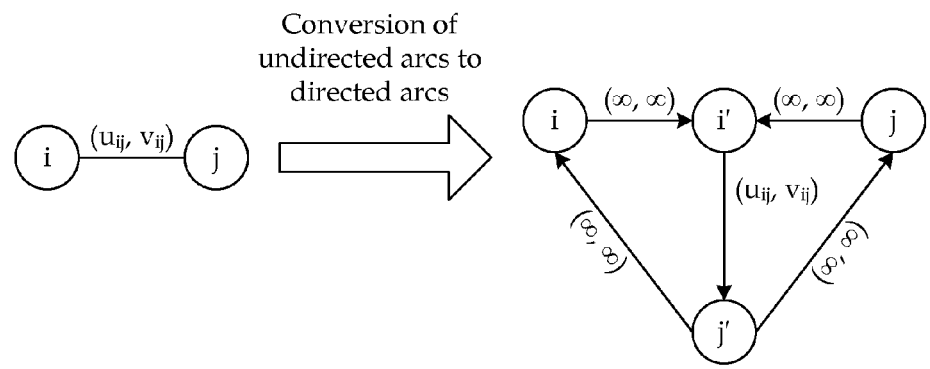
FIG. 5 is an illustration of various techniques to simplify modeling of one or more aspects of a disrupted system according to one or more embodiments.
Figure 5:
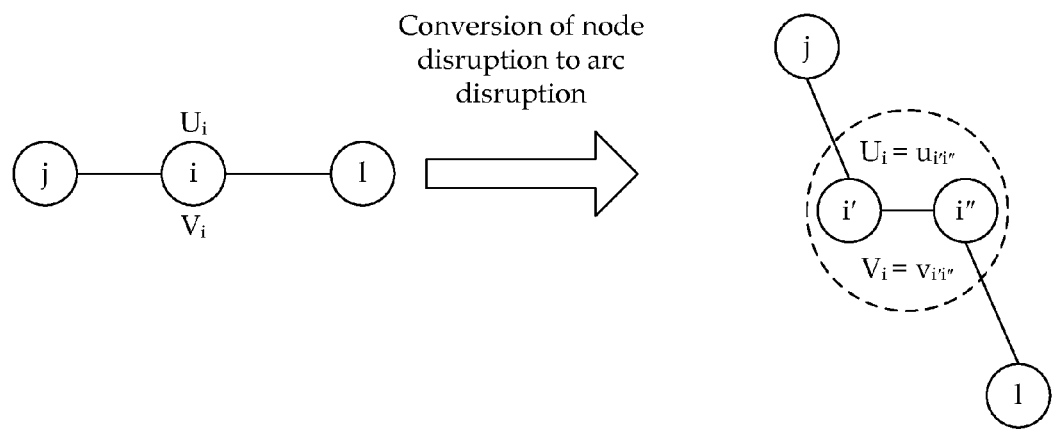

Turning briefly to FIG. 5, illustrated are various techniques to simplify modeling of one or more aspects of a disrupted system according to one or more embodiments. As shown in FIG. 5, an undirected arc can be converted into directed arcs within the bounds of the above described directed network model. Systems, such as telecommunications networks, can include bi-directional links which can be represented as two directed links. For instance, a bi-directional link between nodes i and j can be represented as one directed link, (i,j), from i to j and another directed link, (j,i), from j to i. For an undirected arc {i,j} such as, for example, a link in a TDD-based communication network, the undirected arc {i,j} is associated with a capacity, $\bar{u}_{ij}$, where some flow can exist from i to j while other flow exists from j to i so long as a total flow between i and j does not exceed $\bar{u}_{ij}$. With a TDD-based communications network, for example, the undirected arc {i,j} can be replaced by two directed arcs, (i, j) and (j,i), opposite in direction, where respective capacities $u_{ij}$ and $u_{ij}$ are equivalent to $\bar{u}_{ij}$. This substitution is possible since, with TDD-based communications, flow does not co-exist in both directions at the same time. However, in some circumstances, the undirected arc {i,j} can allow flow to co-exist in both directions simultaneously. Under these circumstances, the undirected are {i,j} with normal capacity $u_{ij}$ and reduce capacity $v_{ij}$ due to disruption can be transformed to a series of directed arcs by including a set of dummy nodes and dummy arcs as shown in FIG. 5. Thus, disruption and recovery of undirected arc {i,j} can be transformed into disruption and recovery of a directed arc (i',j'). The dummy nodes and arcs, under this example, are not subject to disruption, and thus, for the dummy nodes and arcs, $u=v=\infty$.

As further shown in FIG. 5, disruption and recovery of a node can similarly be transformed into disruption and recovery of a directed link such that the model described above can exhibit node disruption and recovery. For example, a node i can have a normal capacity $U_i$ which is reduced to $V_i$ after disruption. Node splitting can be utilized to model node disruption as a link disruption. Node i can be split into two nodes, i' and i", with a directed arc (i',i") between the two nodes, wherein $u_{i'i''}=U_i$ and $v_{i'i''}=V_i$. Moreover, arcs from node j to node i are replaced with arcs from node j to node i' and arcs from node i to node l are replaced with arcs from node i" to node l.

Referring back to FIG. 4, progressive recovery system 400 can also include a recovery subsystem 420 configured to generate a schedule 412 that specifies an order of allocation of available resources 406 among the set of nodes and the set of links with reduced capacities, as indicated by system model 404, to facilitate progressive recovery of the system from the disruption based on a recovery condition 408 relative to a characteristic of the system. Schedule 412, according to a specific, non-limiting example, can represent an optimum allocation of resources from available resources 406 to achieve recovery condition 408 relative to the characteristic of the system.

In an aspect, available resources 406 can include at least one of manpower, equipment, or parts available at a particular time. According to one example, the recovery condition, in an example of a communications network, can specify a predetermined amount of traffic flow capacity to be recovered with a predetermined time period. In another example, the recovery condition can specify a predetermined time period within which a maximum or substantially maximum amount of traffic flow capacity is to be recovered.

In a specific, non-limiting example, in furtherance of the directed network model embodiment of system model 404, recovery subsystem 420 can be configured to implement and carry out the following technique. From the model, G(N,E), a set, $\Omega$, of source-destination pairs can be extracted. A pair, $\omega \in \Omega$, can include a source node $s(\omega) \in N$, a destination node $t(\omega) \in N$, and a respective flow demand from $s(\omega)$ to $t(\omega)$. In one aspect, recovery subsystem 420 is configured to regard a capacity of the disrupted system in terms of a maximum total flow that can be sent from $s(\omega)$ to $t(\omega)$, for every pair, $\omega \in \Omega$, subject to flow conservation and link capacity constraints. However, other configurations can be employed in the alternative.

One or more links $(i,j) \in E$ can connect $s(\omega)$ to $t(\omega)$ and, as described above, the one or more links (i,j) can be disrupted such that capacities of the respective links are reduced to $v_{ij}$ from normal operating capacities of $u_{ij}$. To recover the system, the disrupted links can be repaired such that the normal operating capacities are restored. To effectuate repair, resources from available resource 406 are employed. However, in some circumstances, available resources 406 can be insufficient to effectuate repair of all network links at once. In view of this, recovery subsystem 420 can schedule the recovery process as a set of stages, wherein during a stage, a subset of affected network links are repaired.

Continuing with this example, repairing link (i, j) consumes $r_{ij}$ units of resources from available resources 406. Available resources 406 can vary from stage to stage since, as mentioned above, some resources are reusable while others are exhaustible. For instance, given a recovery process having K stages (K≥1), there are $R_k$ units of resources available for stage k(1≤k≤K). In accordance with this example, recovery subsystem 420 can determine which network links (i,j) among the one or more links disrupted are to be repaired in stage k, subject to available resources 406.

For the purposes of the following discussion regarding this example, a network link (i,j) maintains a capacity of $v_{ij}$ until $r_{ij}$ have been allocated for repair of link (i,j). However, a repair operation is resumable across stages such that once sufficient resources are allocated for repair of link (i,j), e.g., a total of $r_{ij}$ units are allocated, link (i,j) can be restored to a pre-disruption capacity of $u_{ij}$. Pursuant to an illustration, link (1,2) can consume $r_{1,2}=5$ units to repair with 2 units available in stage 1 (e.g., $R_1=2$) and 4 units available in stage 2 (e.g., $R_2=4$). If 1 unit is allocated during stage 1, the capacity of link (1,2) remains at $v_{1,2}$ at the end of stage 1. If 4 additional units are allocated during stage 2, then, at the end of stage 2, link (1,2) is restored to have a capacity of $u_{1,2}$.

Recovery subsystem 420, with an ultimate goal of scheduling complete repair and recovery of a disrupted system, can evaluate dynamics of progressive recovery that characterize how total capacity of the system increases over the K stages. For instance, recovery subsystem 420 can identify a set, $\Phi_k$, of fully-operational links and evaluate, during scheduling of respective stages, a maximum flow, $F_k^\omega$ from a source node $s(\omega)$ to a destination node $t(\omega)$ after stage k. The maximum flow, $F_k^\omega$, between a pair of nodes, $\omega$, can be determined according to the following. The maximum flow can be a summation of a maximum flows of all paths between source node $s(\omega)$ and destination node $t(\omega)$ provided that, for overlapping paths, the summation can be a minimum value among a summation of maximum flows of overlapping paths or a smallest capacity value among overlapping links shared by the overlapping paths. For example, if a set of overlapping paths have a total capacity, when added together, of 10 units, but share a link with a capacity of 2 units, then the maximum flow over the set of overlapping paths, when put together, is 2 units due to a bottleneck effect at the shared link. For a given path, the maximum flow over that path can be evaluated as described above with reference to FIG. 1. For instance, the maximum flow over a path can be equivalent to a flow capacity of a link of the path having the smallest flow capacity. Moreover, the flow capacity of a link (i,j) can be determined according to the following:

$$\begin{cases} u_{ij} & \text{for } (i,j) \in \Phi_k \\ v_{ij} & \text{otherwise} \end{cases}$$

From the foregoing quantities, a total flow of the system, after stage k, can be determined as $T_k = \Sigma_{\omega \in \Omega} F_k^\omega$.

For a stage, k, a source-destination pair, $\omega$, can be assigned a weight, $w_k^\omega$ to indicate an importance of supporting the pair $\omega$ during stage k, where $0 \leq w_k^\omega \leq 1$ and $\Sigma_{k=1}^K \Sigma_{\omega \in \Omega} w_k^\omega = 1$. In one aspect, the weights can be specified by information include in recovery condition 408. A weighted total flow at stage k can be evaluated as $T'_k = \Sigma_{\omega \in \Omega} w_k^\omega F_k^\omega$. In addition to the previous quantities, recovery subsystem 420 can evaluate an accumulative weight total (AWT) flow, over the K stages, to measure an effectiveness of a recovery process. This metric can be provided by:

$$AWT = \sum_{k=1}^{K} T'_k = \sum_{k=1}^{K} \sum_{\varpi \in \Omega} w_k^{\varpi} F_k^{\varpi} \quad (1)$$

To facilitate presentation hereinafter, the following notation, $\overline{w}_k = \sum_{\varpi \in \Omega} w_k^{\varpi}$, is introduced to indicate an overall weight assigned to stage k.

Based upon the foregoing definitions for this example, recovery subsystem 420 can generate schedule 412 such that AWT is maximized. In this regard, respective weights can be configured (e.g., via recovery condition 408) to achieve various objectives. For instance, if a first pair, ($\omega_1$, is more important than a second pair, $w_2$, at the end of stage k (e.g., the first pair is a primary or backbone link while the second pair is a tributary), then a higher weight can be assigned to the first pair for stage k (e.g., $w_k^{\overline{\omega}_1} > w_k^{\overline{\omega}_2}$). According to another illustration, when a larger flow is desired as early as possible, then weights can be assigned such that $\overline{w}_1 \le \overline{w}_2 \le \ldots \le \overline{w}_K$ to place more emphasis on earlier stages.

Recovery subsystem 420, according to this example, can employ mixed integer linear programming (MIP) techniques to generate schedule 412. For instance, given $x_{ijk}^{\varpi}$, which represents a flow quantity on link (i,j) after completion of stage k and $y_{ijk}$, which represents a binary value where $y_{ijk}=1$ when link (i,j) is restored at the end of stage k, recovery subsystem 420 can formulate a MIP situation as follows:

$$\max \sum_{k=1}^{K} \sum_{\varpi \in \Omega} w_k^{\varpi} F_k^{\varpi} \quad (2)$$

subject to:

$$\sum_{j:(i,j) \in E} x_{ijk}^{\varpi} - \sum_{j:(j,i) \in E} x_{jik}^{\varpi} = \begin{cases} F_k^{\varpi} & \text{if } i = s(\varpi) \\ -F_k^{\varpi} & \text{if } i = t(\varpi), \\ 0 & \text{otherwise} \end{cases} \quad (3)$$

$$\varpi \in \Omega, i \in N, k = 1, \ldots, K$$

$$\sum_{\varpi \in \Omega} x_{ijk}^{\varpi} \le v_{ij} + (u_{ij} - v_{ij}) \sum_{l=1}^{k} y_{ijl}, (i, j) \in E, k = 1, \ldots, K \quad (4)$$

$$\sum_{l=1}^{k} \sum_{(i,j) \in E} y_{ijl} r_{ij} \le \sum_{l=1}^{k} R_l, k = 1, \ldots, K \quad (5)$$

$$\sum_{k=1}^{K} y_{ijk} \le 1, (i, j) \in E \quad (6)$$

$$x_{ijk}^{\varpi} \ge 0, y_{ijk} \in \{0, 1\} \quad (7)$$

In the formulation presented above, expression (2) represents a goal of recovery subsystem 420 when generating schedule 412. Expression (3) represents a flow conservation concept in which all flow into a node will exit the node, unless the node is a source node or a destination node of a given communication pair. Expression (4) represents a capacity constraint which specifies that a link cannot be over-repaired (e.g., exceed normal operating capacities as designed). Expression (5) represents resource availability in which an amount of resources allocated up to and including stage k cannot exceed a total amount of available resources across all stages up to and including stage k. Expression (6) indicates that each disrupted link is repaired only once for a given recovery process and expression (7) represent valid values for some variables.

From the MIP formulation above, recovery subsystem 420 can determine a first set, $\{x_{ijk}^{\overline{\omega}}\}$, and a second set, $\{y_{ijk}\}$. The second set can be utilized by the recovery subsystem 420 to indicate when to repair a disrupted link, e.g., to generate schedule 412. For instance, within the second set, links respectively associated with values $y_{i,j,1}=1$ can be scheduled for repair during stage k=1 (e.g., the first stage). Resources, from available resources 406, remaining after allocation to links scheduled in the first stage can be allocated to partially repair links scheduled for stage 2 (e.g., links associated with values $y_{i,j,2}=1$ in the second set). In general, for a stage k, remaining resources can be scheduled to effectuate repair on a link scheduled for repair during stage k+1.

The foregoing example provides one mechanism by which recovery subsystem 420 can generate schedule 412 based upon recovery condition 408, network model 404, and available resources 406. Further details of recovery condition 408 and other techniques employed by recovery subsystem 420 to generate schedule 412 are provided later.

Figure 6:
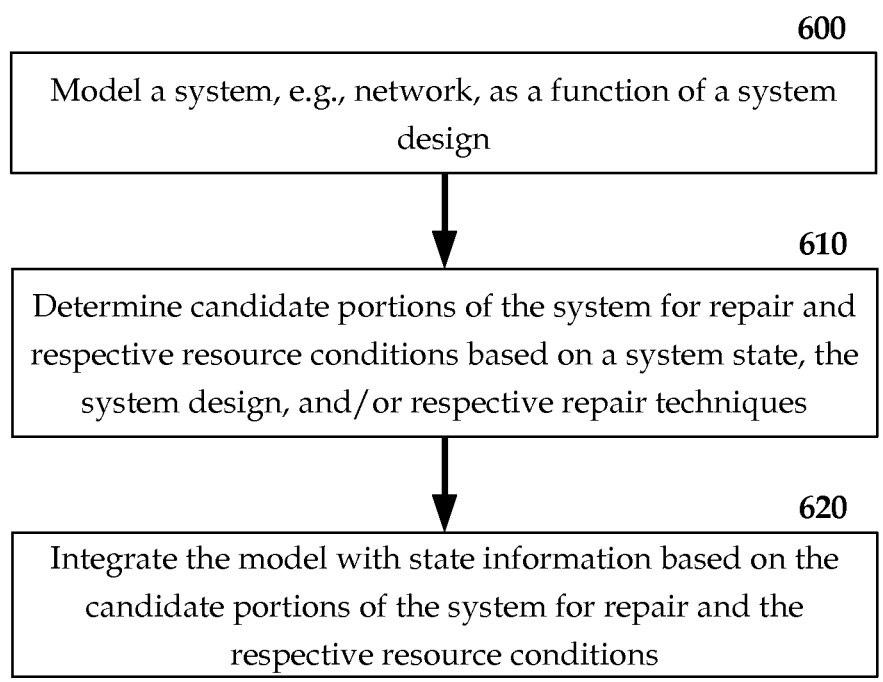
FIG. 6 illustrates a flow diagram of an example, non-limiting embodiment for creating a model of a system.

Turning to FIG. 6, illustrated is a flow diagram of an example, non-limiting embodiment for creating a model of a system. At 600, a model of a system (e.g., a communications network, computing network, transportation network, etc.) is generated based on a system design. At 610, candidate portions of the system for repair and respective resource conditions associated with the candidate portions are determined based on a system state, the system design, and/or respective repair techniques associated with the candidate portions. By way of example, different portions of the system are repaired via different techniques. Moreover, different portions and/or techniques require different amounts of resources to effectuate repair. At 620, the model is integrated with state information based on the candidate portions of the system for repair and the respective resource conditions. In one example, the state information can indicate reduced capacities of disrupted links, normal operating capacities of disrupted links, and resources requirements to restore disrupted links to normal operating capacities.

Figure 7:
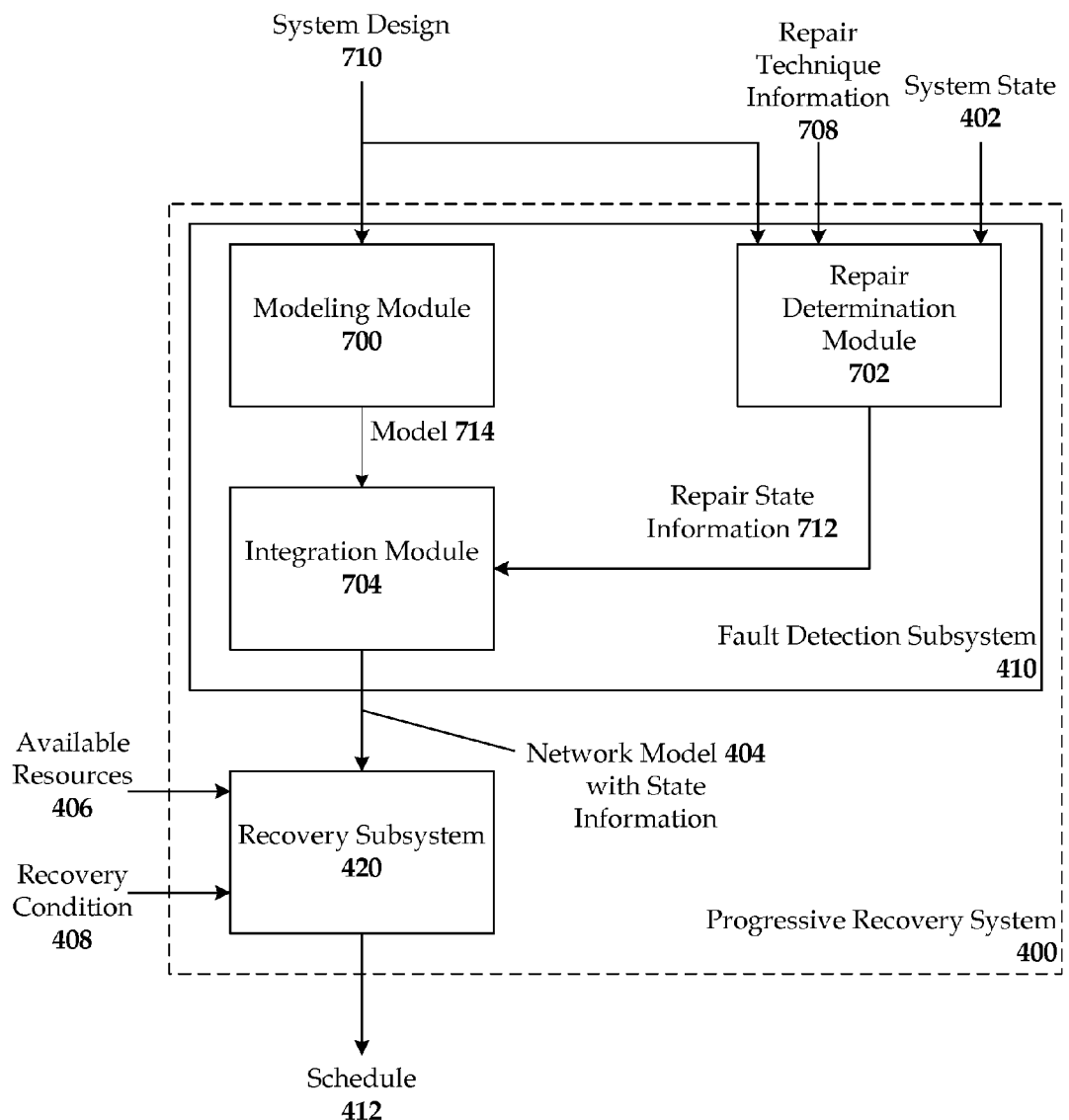
FIG. 7 is a block diagram of an example, non-limiting act of generating a model of a system to facilitate scheduling recovery of the system.

FIG. 7 is a block diagram of an example, non-limiting act of generating a model of a system to facilitate scheduling recovery of the system. As shown in FIG. 7, fault detection subsystem 410 can include a modeling module 700 configured to create a model 714 based on a system design 710. System design 710 can specify components of a system, interconnections among the components of the system, respective capacities and capabilities of the components and interconnections, and the like. Model 714, in one example, can be directed network model described above. However, it is to be appreciated that other models can be employed with the progressive recovery scheduling techniques described herein.

Fault detection subsystem 410 can also include a repair determination module 702 configured to generate repair state information 712 as a function of system design 710, repair technique information 708, and system state 402. For instance, based on system state 402 and system design 710, repair determination module 702 can be configured to identify components of the system and/or interconnections among components that are degraded from normal operating capacities (e.g., capacities as designed or indicated in system design 710). To facilitate such identification, system state 402 can include current metrics (e.g., measurement of capacities) of respective components and interconnections of the system.

In another aspect, repair determination module 702 is configured to determine resource requirements to effectuate restoration of degraded components or interconnections of the system. For example, repair determination module 702 can receive repair technique information 708 that specifies repair techniques utilized for respective components and/or interconnections of the system and respective resources employed by those repair techniques. Repair determination module 702 can incorporate information identifying degraded components and interconnections of the system and respective resource requirements to restore the degraded components and interconnections into repair state information 412.

As shown in FIG. 7, fault detection subsystem 410 can include an integration module 704 configured to integrate model 714 and repair state information 712 to generate network model 404 with state information. As described above, network model 404 can be utilized by recovery subsystem 420 which is configured to generate a schedule 412 for a recovery process based on network model 404, available resources 406, and recovery condition 408.

Figure 8:
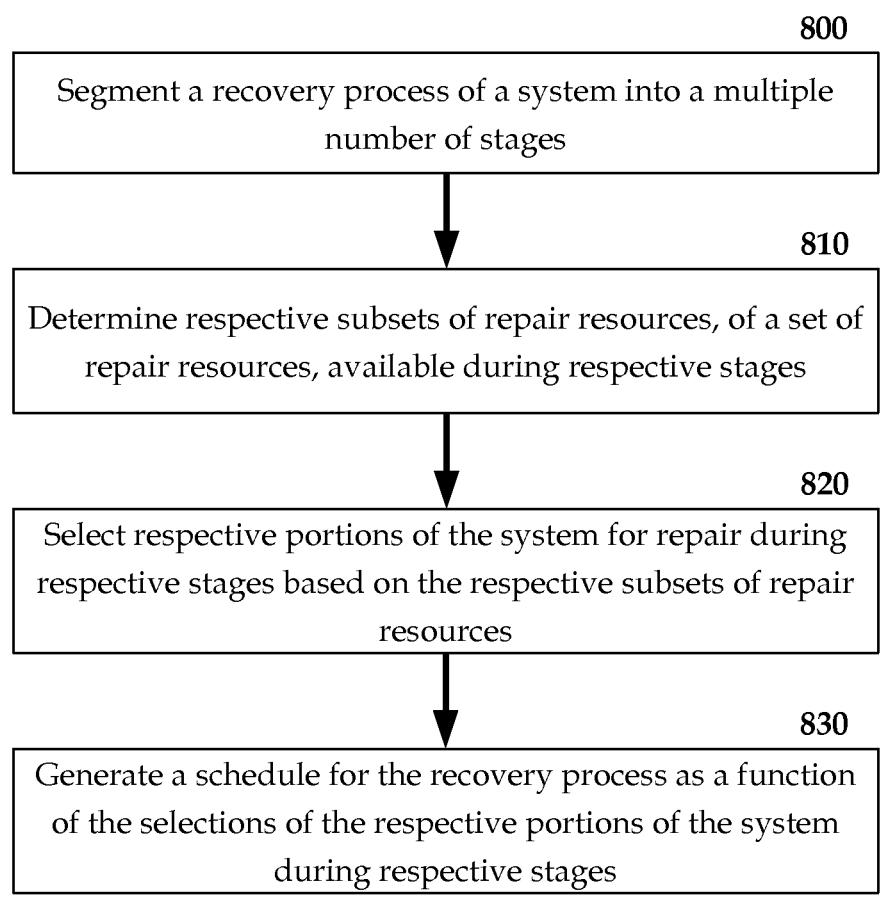
FIG. 8 is a flow diagram of an example, non-limiting embodiment for scheduling a repair process in terms of a multiple number of stages.

FIG. 8 is a flow diagram of an example, non-limiting embodiment for scheduling a repair process in terms of a multiple number of stages. At 800, a recovery process is segmented into a multiple number of stages. In an example, stages can represent discrete time intervals (e.g., a stage is an hour, a day, a week, etc.) of the recovery process. In another example, stages can represent indefinite time intervals such that a respective duration of a stage is determined as a function of a repair time of system components scheduled during the stage. In accordance with the latter, a stage develops when a subset of degraded system components are allocated all available repair resources. Remaining degraded system components are then scheduled for later stages once the subset is repaired and/or additional resources become available.

At 810, respective subsets of repair resources, of a set of repair resources, available during respective stages are determined. In an aspect, the respective subsets of resources are respectively associated with stages of the multiple number of stages. According to an example, a full amount of resources available over the course of a recovery process can include resources which are available for a time shorter than the time of the entire recovery process. For instance, some resources can be available during early stages but become exhausted for later stages.

At 820, respective portions of the system are selected for repair during respective stages of the multiple number of stages based on the respective subsets of repair resources. At 830, a schedule is generated for the recovery process as a function of the selections of the respective portions of the system during respective stages.

Figure 9:
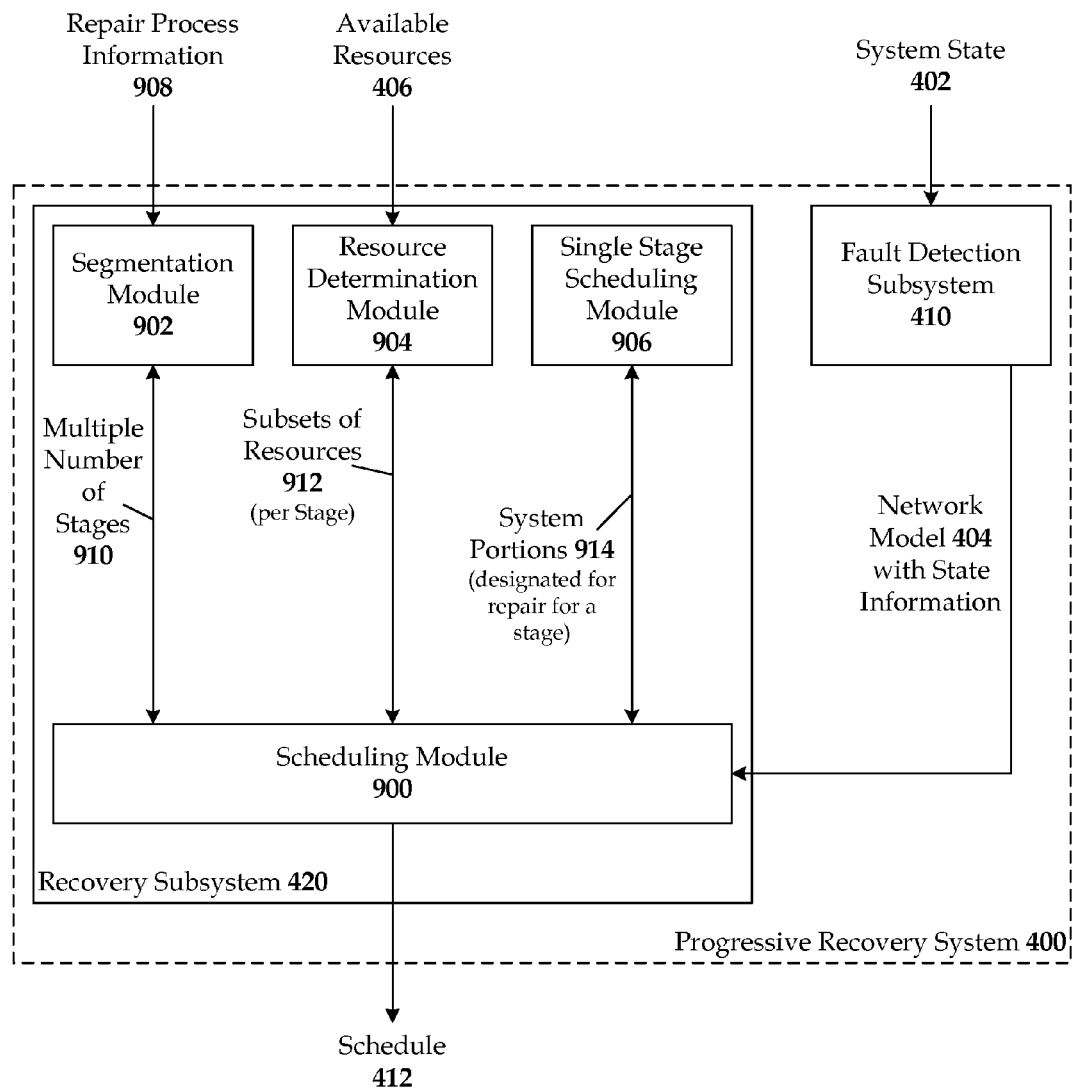
FIG. 9 is a block diagram of an example, non-limiting act of determining a repair schedule as a function of a multiple number of stages, a set of resources, and identified portions of a system in need of repair.

FIG. 9 is a block diagram of an example, non-limiting act of determining a repair schedule as a function of a multiple number of stages, a set of resources, and identified portions of a system in need of repair. As shown in FIG. 9, recovery subsystem 420 can include a scheduling module 900 configured to generate a schedule 900 based upon a multiple number of stages 910, subsets of resources 912 (per stage), and system portions 914 designated for repair for a stage. As further shown in FIG. 9, recovery subsystem 420 can include a segmentation module 902 configured to divide a recovery process, delineated in repair process information 908, into the multiple number of stages 910, a resource determination module 904 configured to specify subsets of resources 912 respectively associated with one or more stages of the multiple number of stages 910, and a single stage scheduling module 906 configured to identify system portions 914 to be repaired during a respective stage. In particular, the resource determination module 904 is configured to determine, for a given stage, a subset of resources from available resources 406 which are available during the stage. The subset of resources can be employed by the single stage scheduling module 906 to identify system portions 906 as candidates for repair during the stage. In one aspect, single stage scheduling module 906 can render scheduling decision based on network model 404, which can be updated, by scheduling module 900, to reflect scheduling decisions previously made by single stage scheduling module 906 for previous stages. Scheduling module 900 can compile respective scheduling decisions, indicated by system portions 914, from single stage scheduling module 906 across all stages of the multiple number of stages 910 to generate schedule 412 for the recovery process.

In accordance with further embodiments, a manner in which scheduling module 900 employs single stage scheduling module 906 can vary depending on overall goals and objectives of a recovery process. As described in the following embodiments, the overall goals and objectives can be expressed by weightings assigned to portions of the degraded system and/or recovery conditions input to the progressive recovery system 400.

Figure 10:
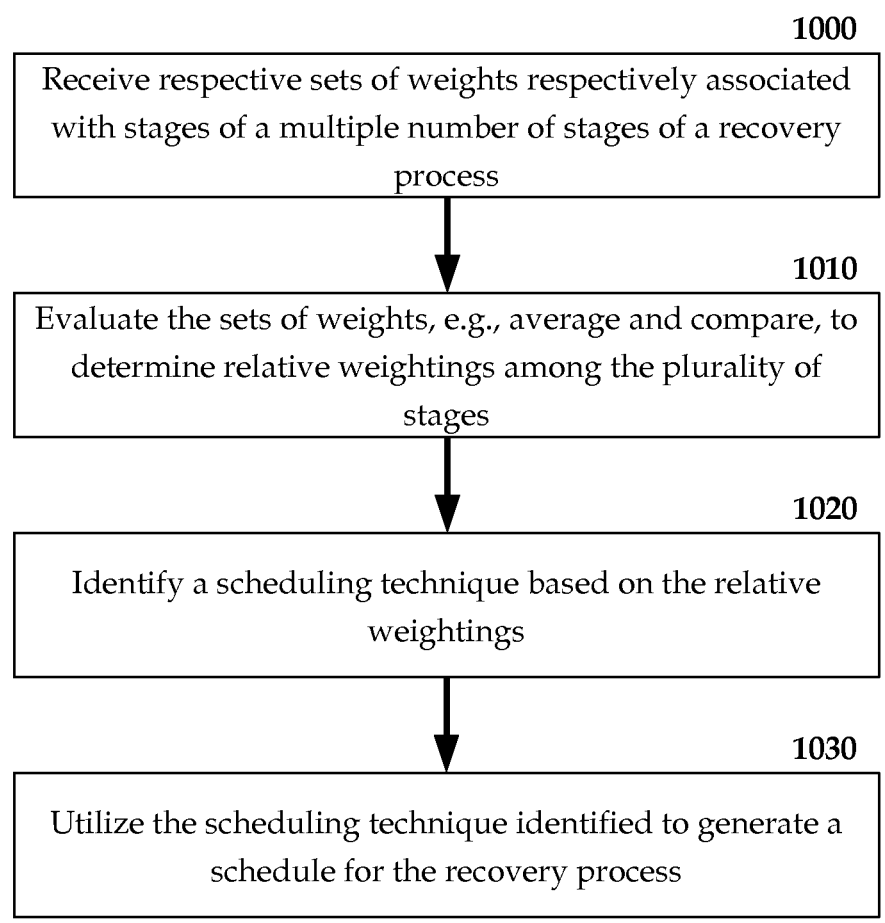
FIG. 10 illustrates a flow diagram of an example, non-limiting embodiment for selecting a scheduling technique based on a set of weights.

FIG. 10 illustrates a flow diagram of an example, non-limiting embodiment for selecting a scheduling technique based on a set of weights. At 1000, respective sets of weights are received in which the respective sets of weights are respectively associated with one or more stages of a multiple number of stages of a recovery process. At 1010, the sets of weights are evaluated, e.g., averaged and compared, to determine relative weightings among the multiple number of stages. At 1020, a scheduling technique is identified based on the relative weightings and, at 1030, the scheduling technique identified is utilized to generate a schedule for the recovery process.

Figure 11:
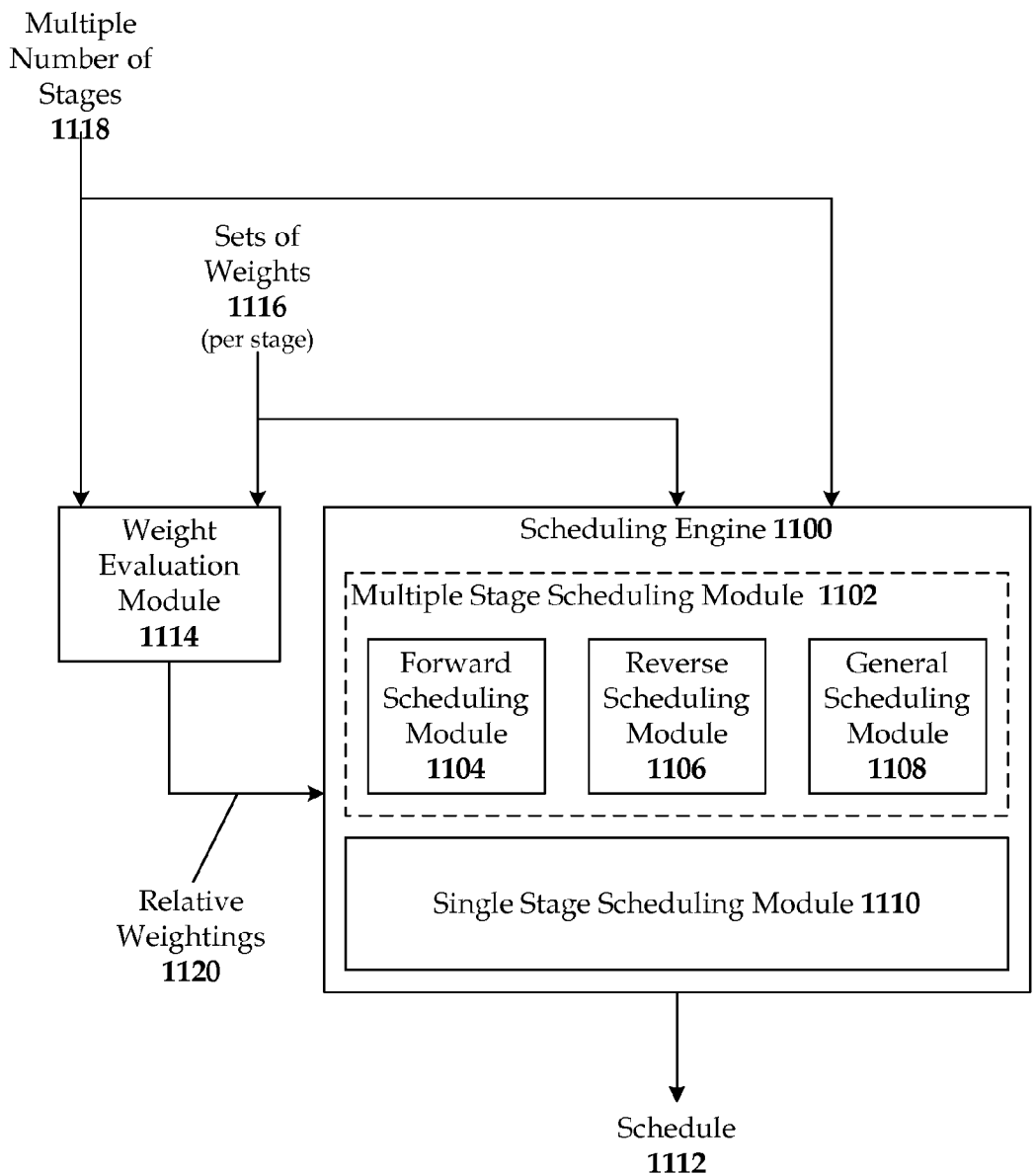
FIG. 11 illustrates a block diagram of an example, non-limiting embodiment of a scheduling engine configured to select a scheduling technique based on sets of weights respectively associated with a multiple number of stages of a recovery process and to employ a selected scheduling technique to schedule a repair process.

FIG. 11 illustrates a block diagram of an example, non-limiting embodiment of a scheduling engine configured to select a scheduling techniques based on sets of weights respectively associated with a multiple number of stages of a recovery process and to employ a selected scheduling technique to schedule a repair process. FIG. 11 depicts a scheduling engine 1100 configured to output a schedule 1112 for a recovery process of a degraded system. In a specific, non-limiting example, scheduling engine 1100 can be incorporated into progressive recovery system 400 and/or recovery subsystem 420 described above with respect to previous figures.

Scheduling engine 1100 can include a multiple stage scheduling module 1102 configured to schedule the recovery process across a multiple number of stages 1118 input to scheduling engine 1100. Repairing a degraded system, after a large-scale disruption, can involve, in some circumstances, multiple individual repair steps, e.g., the repair cannot be done in a single pass. Accordingly, the repair process can be segmented into stages in which a portion of the degraded system is repaired during each stage. Multiple stages scheduling module 1102 is configured to employ a single stage scheduling module 1110 to individual schedule stages from the multiple number of stages 1118 and aggregated the individual schedules to generate schedule 1112.

According to one or more embodiments, multiple stage scheduling module 1102 is configured to utilize one or more varying techniques of employing single stage scheduling module 1110. For example, as shown in FIG. 11, multiple stage scheduling module 1102 can include a forward scheduling module 1104 configured to start stage scheduling from a first stage in time and progress to a last stage in time, a reverse scheduling module 1106 configured to start stage scheduling from a last stage in time and work backwards to a first stage in time, and a general scheduling module 1108 configured to start stage scheduling from a predetermined stage and progress, forwards and/or backwards, from the predetermined stage. Details regarding single stage scheduling, and the various multiple stage scheduling techniques will be explained later.

The various multiple stage scheduling techniques operate to achieve differing goals and objectives of an overall recovery process. For example, forward scheduling module 1104 emphasizes maximum recovery in earlier stages whereas the reverse scheduling module 1106 emphasizes later stages (e.g., recovered capacity is larger for later stages). General scheduling module 1108 operates to maximize recovery for an identified stage. For example, for a 10 day (e.g., 10 stage recovery process), general scheduling module 1108 is configured to provide maximum recovery by day two.

In one aspect, selection of the various techniques can be facilitated by sets of weights 1116 respectively assigned to each stage. A respective set of weights from the sets of weights 1116 can include one or more weights respectively associated with communication pairs of the degraded system. A weight evaluation module 1114 is provided to evaluate the sets of weights to generate relative weightings 1120. For instance, weight evaluation module 1114 is configured to evaluate an average weight for each set of weights of the sets of weights 1116. The average weight for each set of weights can represent an overall weight of respective stage of the multiple number of stages 1118. The weight evaluation module 1114 is further configured to compare respective averages to rank stages of the multiple number of stages 1118. Scheduling engine 1100 can utilize the rank, e.g., the relative weightings 1120, to select a scheduling technique. By way of example, forward scheduling module 1104 can be utilized when the relative weightings 1120 favor earlier stages, reverse scheduling module 1106 can be utilized when the relative weightings 1120 favor later stages, and the general scheduling module 1108 can be utilized when the relative weightings 1120 indicate arbitrary weight assignment. However, it is to be appreciated that scheduling engine 1100 can utilize any one of the aforementioned scheduling techniques regardless of relative weightings 1120 provided by weight evaluation module 1114.

Figure 12:
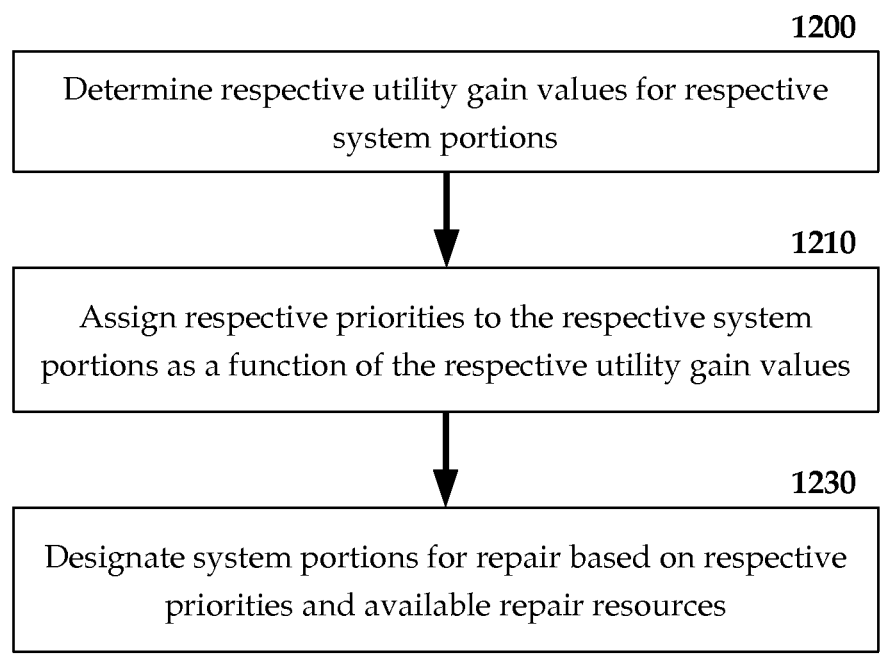
FIG. 12 is a flow diagram illustrating an example, non-limiting embodiment for scheduling repair resources for a single stage of a recovery process.

FIGS. 12-16 illustrate respective flow diagrams of example, non-limiting embodiments implemented by the multiple stage scheduling module 1102 and the single stage scheduling module 1110 described above. Turning to FIG. 12, illustrated is a flow diagram of an example, non-limiting embodiment for scheduling repair resources for a single stage of a recovery process. According to an example, a method illustrated in FIG. 12 can be employed by single stage scheduling module 1110 of FIG. 11. At 1200, respective utility gain values for respective system portions are determined. In an example, utility gain of a system portion represents an amount of total system capacity restored by restoration of the system portion per unit of resource allocated for repair of the system portion. At 1210, respective priorities are assigned to respective system portions as a function of respective utility gain values. For instance, higher priorities can be assigned to system portions having higher utility gain values. At 1230, system portions are designated for repair based on respective priorities and available resources. For example, a highest priority system portion can be designated and allocated a portion of resources from the available resource. A next highest priority system portion can be designated provided sufficient resources remain among available resources after deducting the portion of resources allocated for repair of the highest priority system portion. This process can continue until all system portions are designated or the available repair resources are exhausted (e.g., fully allocated).

Figure 13:
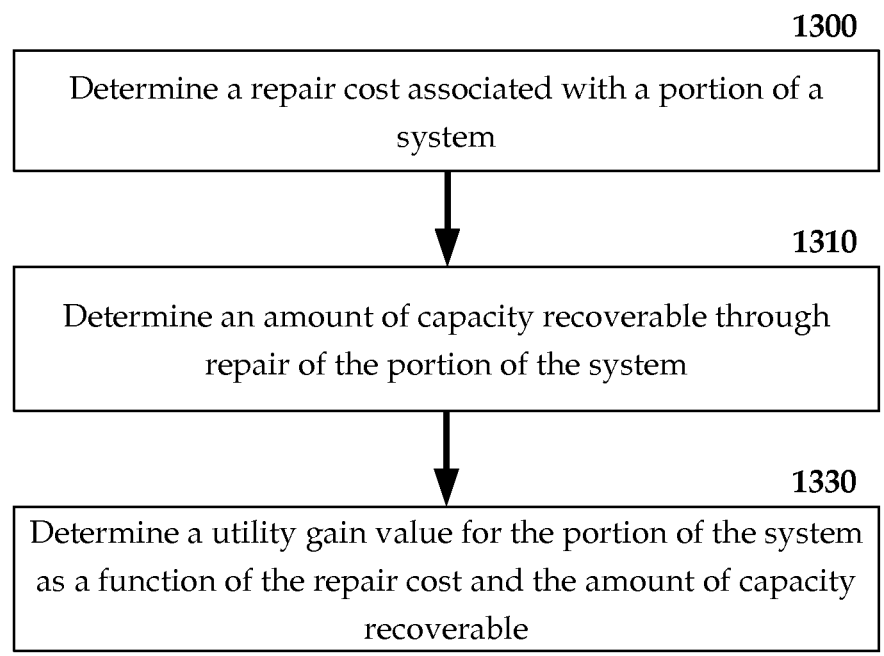
FIG. 13 is a flow diagram illustrating an example, non-limiting embodiment for determining a utility gain associated with repairing a respective portion of a disrupted system.

FIG. 13 is a flow diagram illustrating an example, non-limiting embodiment for determining a utility gain associated with repairing a respective portion of a disrupted system. At 1300, a repair cost associated with a portion of a system is determined. The repair cost, in an example, can be a number of resource units required to repair the portion of the system. At 1310, an amount of capacity recoverable through repair of the portion of the system is determined. The amount of capacity recoverable can represent an amount of total capacity of the system regained when the portion of the system is repaired. At 1330, a utility gain value for the portion of the system is determined as a function of the repair cost and the amount of capacity recoverable. In one example, the utility gain value can be a ratio between amount of capacity recoverable and the repair cost.

Figure 14:
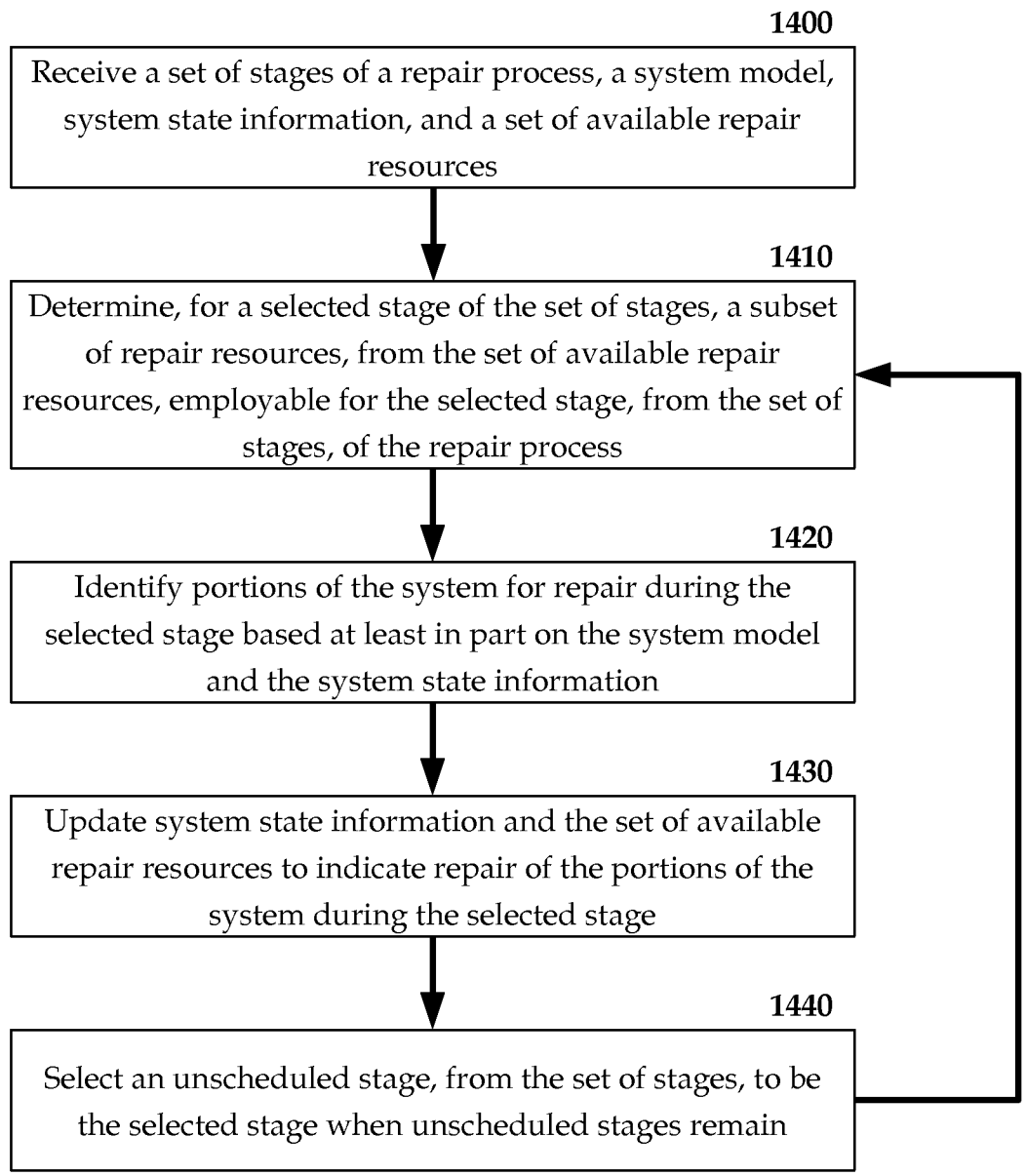
FIG. 14 is a flow diagram illustrating an example, non-limiting embodiment for scheduling repair resources for multiple stages of a recovery process.

FIG. 14 is a flow diagram illustrating an example, non-limiting embodiment for scheduling repair resources for multiple stages of a recovery process. According to an example, the method in FIG. 14 can be employed by forward scheduling module 1104 of FIG. 11. Particularly, FIG. 14 illustrates an embodiment wherein single stage scheduling module 1110 is recursively employed to implement multiple stage scheduling. At 1400, a set of stages of a repair process, a system model, system state information, and a set of available repair resources are received. At 1410, for a selected stage from the set of stages, a subset of repair resources, from the set of available resources is determined, employable for the selected stage of the repair process. At 1420, portions of the system are identified for repair during the selected stage based at least in part on the system model, the system state information, and the subset of repair resources employable for the selected stage. In an aspect, step 1420 can be implemented by single stage scheduling module 1110 in accordance with the methods described in connection with FIGS. 12 and 13 and/or other embodiments described below. At 1430, system state information and the set of available repair resources are updated to indicate repair of the portions of the system during the selected stage and the resources consumed during the repair. At 1440, an unscheduled stage, from the set of stages, is selected to be the selected stage, when unscheduled stages remain. As shown in FIG. 14, the unscheduled stage becomes the selected stage for a subsequent recursion in which the method returns to 1410 for another pass based on the information updated at 1430 and the new stage selected at 1440.

Figure 15:
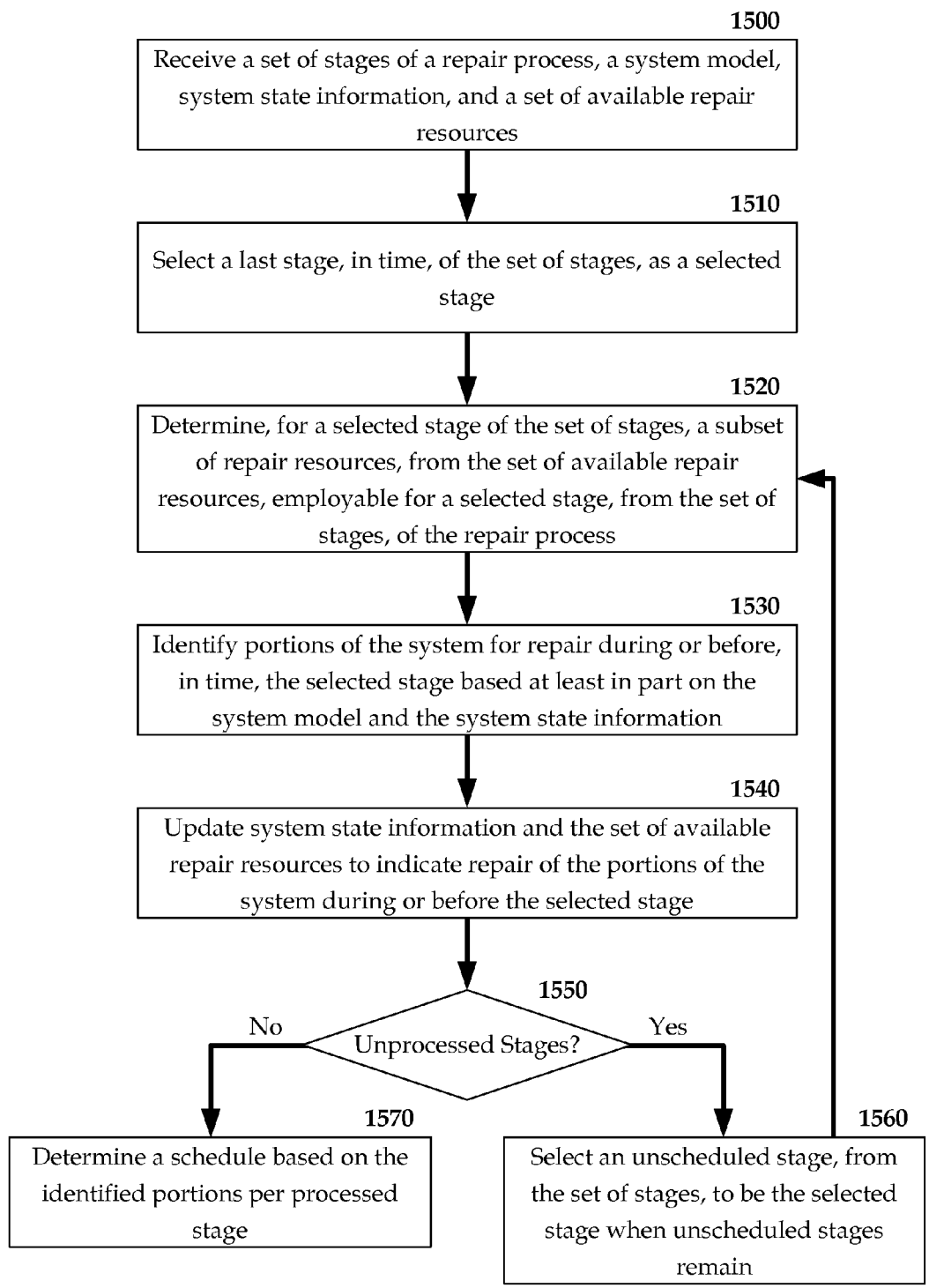
FIG. 15 illustrates a flow diagram of an example, non-limiting embodiment for scheduling repair resources for multiple stages of a recovery process.

FIG. 15 illustrates a flow diagram of an example, non-limiting embodiment for scheduling repair resources for multiple stages of a recovery process. According to an example, the method in FIG. 15 can be employed by reverse scheduling module 1106 of FIG. 11. Particularly, FIG. 15 illustrates an embodiment wherein single stage scheduling module 1110 is recursively employed to implement multiple stage scheduling. At 1500, a set of stages of a repair process, a system model, system state information, and a set of available repair resources are received. At 1510, a last stage, in time, of the set of stages, is selected as a selected stage. At 1520, for the selected stage from the set of stages, a subset of repair resources, from the set of available resources is determined, employable for the selected stage of the repair process. At 1530, portions of the system are identified for repair during the selected stage based at least in part on the system model, the system state information, and the subset of repair resources employable for the selected stage. In an aspect, step 1530 can be implemented by single stage scheduling module 1110 in accordance with the methods described in connection with FIGS. 12 and 13 and/or other embodiments described below.

At 1540, system state information and the set of available repair resources are updated to indicate repair of the portions of the system during or before the selected stage, in time, and the resources consumed for those repairs. At 1550, a determination is made as to whether there are unprocessed stages. If there are no unprocessed stages then, at 1570, a schedule is determined based on identified portions of the system per stage. If there are unprocessed stages then, at 1560, an unscheduled stage, from the set of stages, is selected to be the selected stage, when unscheduled stages remain. As shown in FIG. 15, the unscheduled stage becomes the selected stage for a subsequent recursion in which the method returns to 1520 for another pass based on the information updated at 1540 and the new stage selected at 1560.

Figure 16:
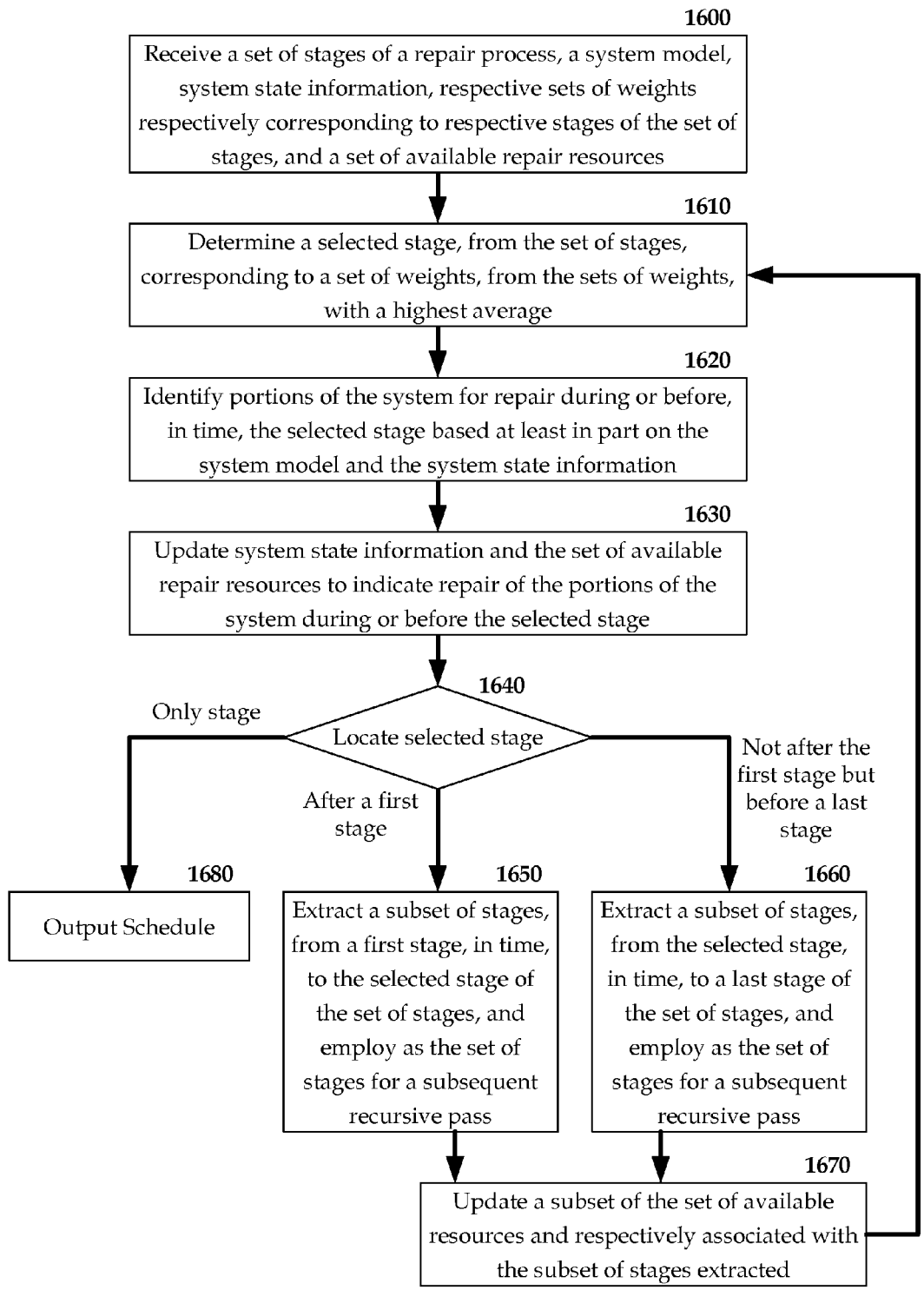
FIG. 16 illustrates a flow diagram of an example, non-limiting embodiment for scheduling repair resources for multiple stages of a recovery process.

FIG. 16 illustrates a flow diagram of an example, non-limiting embodiment for scheduling repair resources for multiple stages of a recovery process. According to an example, the method in FIG. 16 can be employed by general scheduling module 1104 of FIG. 11. Particularly, FIG. 16 illustrates an embodiment wherein single stage scheduling module 1110 is recursively employed to implement multiple stage scheduling. At 1600, a set of stages of a repair process, a system model, system state information, respective sets of weights respectively corresponding to respective stages of the set of stages, and a set of available repair resources are received. At 1610, a selected stage, form the set of stages, is determined such that the selected stage corresponds to a set of weights, from the sets of weights, with a highest average. At 1620, portions of the system are identified for repair during the selected stage based at least in part on the system model, and system. In an aspect, step 1620 can be implemented by single stage scheduling module 1110 in accordance with the methods described in connection with FIGS. 12 and 13 and/or other embodiments described below. At 1630, system state information and the set of available repair resources are updated to indicate repair of the portions of the system during or before the selected stage, in time, and the resources consumed for those repairs.

At 1640, the selected stage, e.g., selected at 1610, is located relative, in time, to other stages in the set of stages. For instance, if at 1640, it is determined that the selected stage is after a first stage of the set of stages, then, at 1650, a subset of stages are extracted from the set of stages such that subset of stages ranges from a first stage, in time, up to, but not including, the selected stage. The subset of stages extracted at 1650 is employed as the set of stages for a subsequent recursion of the method depicted in FIG. 16.

If at 1640, however, it is determined that the selected stage is the first stage but before a last stage of the set of stages, then, at 1660, a subset of stages are extracted from the set of stages such that subset of stages ranges, in time, from, but does not include, the selected stage up to the last stage. The subset of stages extracted at 1660 is employed as the set of stages for a subsequent recursion of the method depicted in FIG. 16. At 1670, a subset of the set of available resources is updated and respectively associated with the subset of stages extracted at either of 1650 and 1660 as the set of resources for a subsequent recursion, which begins at 1610.

Further, if, at 1640, it is determined that the selected stage is the only stage in the set of stages, then, at 1680, a schedule for the recovery process is output.

The foregoing embodiments describe one or more techniques to schedule a progressive recovery of a degraded system subject to a recovery condition. What follows now is a description of alternative embodiments discussed in terms of the detailed example provided above relative to a directed network model of a degraded system. According to an example, the following embodiments can be employed and/or implemented by single stage scheduling module 1110 and multiple stage scheduling module 1102 of FIG. 11.

For instance, single stage scheduling module 1110 can be configured to identify, for a stage, a subset of links to be repaired so as to maximum a total flow of the system subject to a given amount of repair resources, R. In one example, the subset of links can be selected in accordance with saturation levels. Given a set of current capacities for the links, $\{v_{ij}\}$, saturated links can be identified as links where $\Sigma_{\bar{\omega}\in\Omega} x_{ijk}^{\bar{\omega}} = v_{ij}$ and unsaturated links can be identified as links where $\Sigma_{\bar{\omega}\in\Omega} x_{ijk}^{\bar{\omega}} < v_{ij}$. Saturated links can be designated for repair before unsaturated links.

According to an alternative approach, expression (2) described above, can be solved subject to the constraints specified by expressions (3)-(7). Sensitivity analysis results, generated by solving expression (2), can provide a shadow price, denoted $\pi_{ij}$, based on expression (4). Intuitively, $\pi_{ij}$ represents a marginal contribution to an optimal objective function value of increasing each $v_{ij}$. In other words, a large value for $\pi_{ij}$ indicates that an increase in a corresponding $v_{ij}$ can increase maximum flow by a large amount. Accordingly, links having a larger $\pi_{ij}/r_{ij}$ value (e.g., larger $\pi_{ij}$ per unit resource $r_{ij}$) can be designated for repair before links with lower $\pi_{ij}/r_{ij}$ values.

More particularly, according to this approach, expressions (2)-(7) are solved with K=1 and $y_{i,j,1}$ set to zero for $(i, j) \in E$ to obtain a maximum flow. Further, based on sensitivity analysis results, $\pi_{ij}$ is extracted for $(i, j) \in E$, and a link $(i,j)$ with the largest $\pi_{ij}/r_{ij}$ is selected for repair first. If unused repair resources remain after the first selection, any links with a positive $\pi_{ij}$ can be repaired subject to resource availability. This process can repeat until repair resources are exhausted (e.g., fully allocated). A pseudo-code listing for this approach is illustrated by the following:

```
Function SS(INPUT: {u_ij}, {v_ij}, {w^ω}, R; OUTPUT: { ŷ_ij })
Local variables: { x_{i,j,1}^ω }, { y_{i,j,1} }, { w_1^ω }
Begin
        Let K = 1, R_1 = R, { w_1^ω }={w^ω}, y_{i,j,1} = 0
        While R_1 > 0 do
        Begin
            Solve via a linear programming (LP) solver of expression
                (2)-(7) with the given y_{i,j,1} and obtain π_ij
            While R_1 > 0 do
            Begin
                Find (i*,j*) =argmax{π_ij/r_ij| y_{i,j,1} = 0, r_ij ≤ R_1}
                Let R_1 = R_1 − r_{i*j*}, y_{i*,j*,1} = 1
            End
        End
        Let ŷ_ij = y_{i,j,1}, (i, j) ∈ E
End
```

The inputs and outputs of Function SS are generalized to facilitate utilization of Function SS as a building block for later embodiments. For instance, Function SS provides scheduling decisions for a single stage of a recovery process. This function block can be utilized, via recursion, for multiple-stage recovery processes.

One recursion technique, is a forward scheduling technique where, for a recovery process with K stages, Function SS is first employed (e.g., called based on SS($\{u_{ij}\},\{v_{ij}\},\{w_1^{\bar{\omega}}\},R_1;\{y_{i,j,1}\}$)) to schedule stage k=1 to identify a set of links to be repaired first in stage 1 so as to maximize $\Sigma_{\bar{\omega}\in\Omega} w_1^{\bar{\omega}} F_1^{\bar{\omega}}$ with $R_1$ units of resources. With stage k=1 scheduled, a single-stage schedule can be generated for stage k=2 by determining a set of links to repair during stage 2 to maximize $$\sum_{k=1}^{2}\sum_{\overline{\omega}\in\Omega} w_k^{\overline{\omega}} F_k^{\overline{\omega}}$$

given that $\Sigma_{\overline{\omega}\in\Omega} w_1^{\overline{\omega}} F_1^{\overline{\omega}}$ is fixed and $R_2$ units of resources are available (plus remaining resources from $R_1$). This process can be repeated until stage k=K is scheduled. A pseudo-code listing for this approach is illustrated by the following:

```
Function Forward(INPUT: {u_ij}, {v_ij}, { w_k^ω̄ }, {R_k}; OUTPUT: {y_ijk})
Local variables: { û_ij }, { v̂_ij }, R̂
Begin
    Let R̂ = 0, û_ij = u_ij, v̂_ij = v_ij
    For k = 1 to k = K do
    Begin
        R̂ = R̂ + R_k
        Call SS({ û_ij },{ v̂_ij },{ w_k^ω̄ },R̂ ;{y_ijk})
        Let v̂_ij = v̂_ij + (û_ij − v̂_ij)y_ijk, R̂ = R̂ − Σ_(i,j)∈E r_ij y_ijk
    End
End
```

Another recursion technique is a reverse scheduling technique that considers a single-stage sub-problem with an input parameter being $R=R_1+\ldots+R_K$ units of repair resources. The solution to the single-stage sub-problem indicates a subset of links to be repaired during stages 1 to K such that $F_K$ (e.g., the maximum flow at the end of stage K) is maximized. In accordance with this approach, $\hat{y}_{ijK}=1$ is output and denotes that link (i,j) is repaired during stages 1 to K. This is distinct from $y_{ijK}=1$ which indicates that link (i,j) is repaired during stage K. After solving this single-stage sub-problem, another sub-problem is solved for stage K−1 with $R=R_1+\ldots+R_{K-1}$ as inputs. This sub-problem identifies links, from those with $\hat{y}_{ijK}=1$, so as to maximize $F_{K-1}$. Similar to the first sub-problem, this sub-problem produces $\{\hat{y}_{i,j,K-1}\}$, where $\hat{y}_{i,j,K-1}$ indicates that link (i,j) is to be repaired during stages 1 to K−1. This process can be repeated until a sub-problem for stage 1 is processed. To extract a repair schedule, it is determined for a link (i,j), if $\hat{y}_{ijK}=1$, then recovery of link (i,j) is completed in stage k*, where k*=min{k|$\hat{y}_{ijk}$=1}. In other words, link (i,j) is repaired in stage k when $\hat{y}_{ijk}$=1 but $\hat{y}_{i,j,k-1}$=0. A pseudo-code listing for this approach is illustrated by the following:

```
Function Reverse(INPUT: {u_ij}, {v_ij}, { w_k^ω̄ }, {R_k}; OUTPUT: {y_ijk})
Local variables: { û_ij }, { v̂_ij }, R̂
Begin
    Let û_ij = u_ij, v̂_ij = v_ij, y_ijk = ŷ_ijk = 0
    For k = K down to k =1 do
    Begin
        R̂ = R_1+...+R_k
        Call SS({ û_ij },{ v̂_ij },{ w_k^ω̄ }, R̂ ;{ ŷ_ijk })
        Let û_ij = v̂_ij + (û_ij − v̂_ij) ŷ_ijk,
    End
    For each link (i,j) with ŷ_ijK = 1
        Let k* = min{k| ŷ_ijk = 1 }, and y_ijk* = 1
End
```

Yet another recursion technique involves identifying a stage k* with a largest weight among the K stages and utilize Function SS to maximize $F_{k*}$ with $R=R_1+\ldots+R_{k*}$ units of resources. Function SS, according to this technique, identifies links to repair during one of stage 1 to stage k*. After processing stage k*, the remaining single-stage schedules can be determined recursively from stage 1 to stage k*−1 by finding a stage k' with a largest weight among the first k*−1 stages, where 1≤k'≤k*−1. In a similar fashion, this technique can be recursively applied for stages k*+1 to K. A pseudo-code listing for this approach is illustrated by the following:

```
Function General(INPUT: {u_ij}, {v_ij}, a, b, {R_a,...,R_b}; OUTPUT: {y_ija,...,y_ijb})
Local variables: { û_ij }, { v̂_ij }, k*
Begin
    Find k* such that w̄_k* = max{ w̄_k|k=a,...,b}
    Call SS({u_ij},{v_ij},{ w_k*^ω̄ }, Σ_(k=a)^(k*) R_k ;{ y_ijk* })
    If k* > a then
        Let v̂_ij = v_ij, û_ij = v_ij + (u_ij − v_ij) y_ijk*
        Call General({ û_ij },{ v̂_ij }, a, k*−1, {R_a,...,R_k*−1};
            {y_ija,...,y_i,j,k*−1})
    If k* < b then
        Let û_ij = u_ij, Let v̂_ij = v_ij + (u_ij − v_ij) y_ijk*
        Let R_k*+1 = R_k*−1 + Σ_(k=a)^(k*) R_k − Σr_ij y_ijk*
        Call General({ û_ij },{ v̂_ij }, k*+1, b, {R_k*+1,...,R_b};
            {y_i,j,k*+1,...,y_ijb})
End
```

In the foregoing examples and embodiments, a simplification, to facilitate description has been applied. This simplification, namely, that a damaged link either has a disrupted capacity $v_{ij}$ or a full capacity $u_{ij}$ depending on whether it has been fully restored by using repair resources $r_{ij}$. It is to be appreciated that partial recovery is possible such that, by using a portion of $r_{ij}$, the capacity of link (i,j) can be increased to a level between $v_{ij}$ and $u_{ij}$.

Partial recovery can be modeled linearly or generally. In a linear model, capacity of a disrupted link increase proportionally to an amount of repair resources allocated. For instance, for a link (i,j) with a pre-recovery capacity of $v_{ij}$, adding 0≤y≤1 (e.g., 0 to 100 percent) of $(u_{ij}-v_{ij})$ capacity uses y×$r_{ij}$ units of repair resources, where y=1 indicates full recovery to $u_{ij}$. This can be implemented in the foregoing embodiments by, for example, altering expression (7) to 0≤$y_{ijk}$≤1, where $y_{ijk}$ indicates a percentage of resource requirement $r_{ij}$ allocated to link (i,j) in stage k.

In a general model, a non-linear relationship can exist between a percentage of resources allocated and an amount of capacity regained. Specifically, for a link (i,j) with a pre-recovery capacity of $v_{ij}$, adding 0≤y≤1 (e.g., 0 to 100 percent) of $(u_{ij}-v_{ij})$ capacity uses $g_{ij}(y,r_{ij})$ units of repair resources, where $g_{ij}(y,r_{ij})$ satisfies two boundary conditions: $g_{ij}(0,r_{ij})=0$ and $g_{ij}(1,r_{ij})=r_{ij}$. The general model can be incorporated into the foregoing embodiments by modifying expression (5) to the following:

$$\sum_{(i,j)\in E} g_{ij}\left(\sum_{l=1}^{k} y_{ijl}, r_{ij}\right) \leq \sum_{l=1}^{k} R_l, k = 1, \ldots, K$$

While modifying expression (5) produces a non-linear programming problem versus a linear programming or mixed integer programming problem, it can still be solved since $g_{ij}(y,r_{ij})$ can be a convex function of y since it is easier to restore capacity at the beginning, with a little amount of resources, while more and more resources are consumed to restore a small amount of capacity later.

Example Computing Environment

Figure 17:
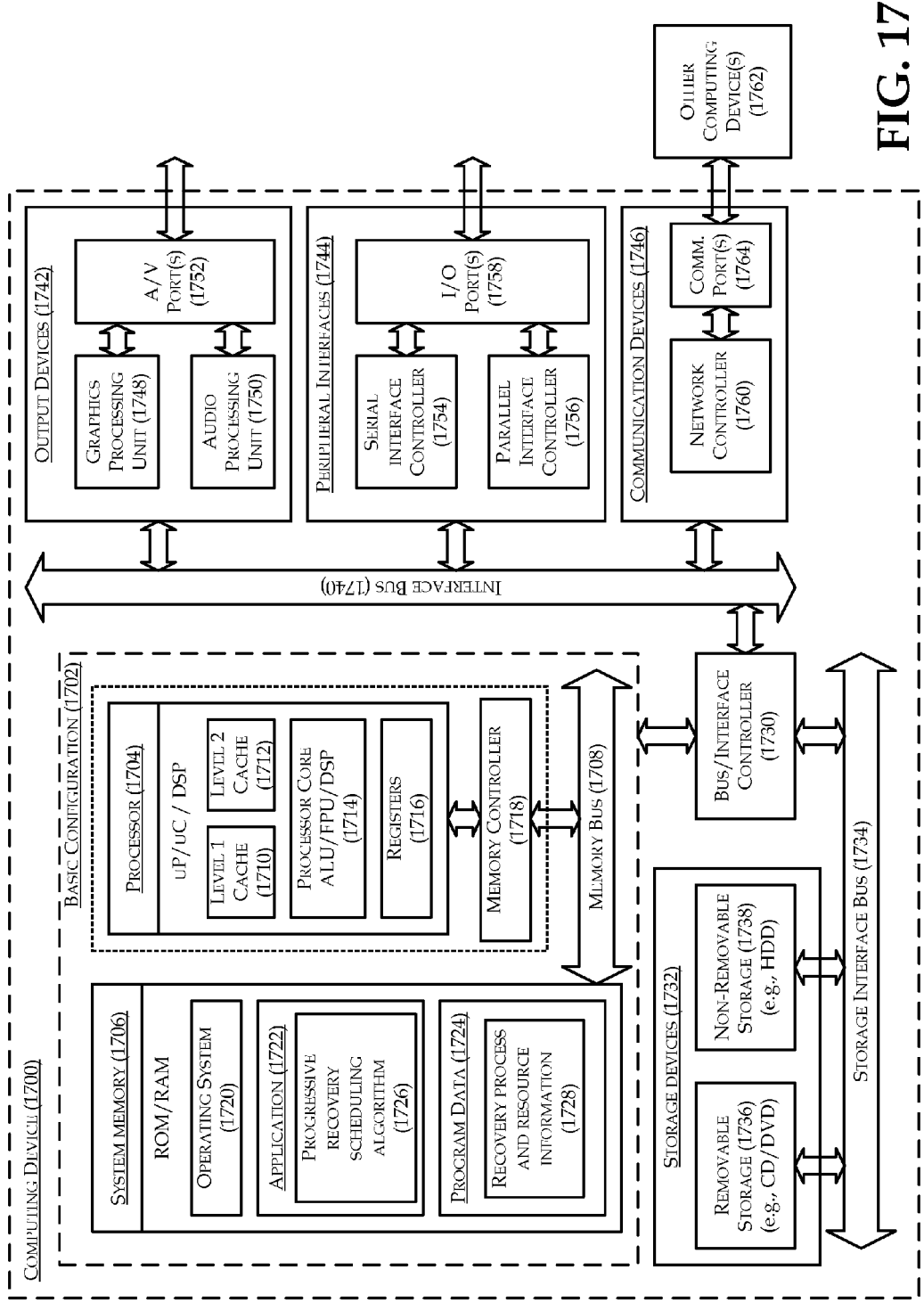
FIG. 17 is a block diagram illustrating an example computing device that is arranged for scheduling progressive system recovery after a disruption in accordance with at least some embodiments of the subject disclosure.

FIG. 17 is a block diagram illustrating an example computing device 1700 that is arranged for scheduling progressive system recovery after a disruption in accordance with at least some embodiments of the subject disclosure. In a very basic configuration 1702, computing device 1700 typically includes one or more processors 1704 and a system memory 1706. A memory bus 1708 may be used for communicating between processor 1704 and system memory 1706.

Depending on the desired configuration, processor 1704 may be of any type including but not limited to a microprocessor (µP), a microcontroller (µC), a digital signal processor (DSP), or any combination thereof. Processor 1704 may include one more levels of caching, such as a level one cache 1710 and a level two cache 1712, a processor core 1714, and registers 1716. An example processor core 1714 may include an arithmetic logic unit (ALU), a floating point unit (FPU), a digital signal processing core (DSP Core), or any combination thereof. An example memory controller 1718 may also be used with processor 1704, or in some implementations memory controller 1718 may be an internal part of processor 1704.

Depending on the desired configuration, system memory 1706 may be of any type including but not limited to volatile memory (such as RAM), non-volatile memory (such as ROM, flash memory, etc.) or any combination thereof. System memory 1706 may include an operating system 1720, one or more applications 1722, and program data 1724. Application 1722 may include a progressive recovery scheduling algorithm 1726 that is arranged to perform the functions as described herein including those described with respect to progressive recovery system 400 of FIG. 4. Program data 1724 may include recovery process and resource information 1728 that may be useful for operation with progressive recovery scheduling algorithm 1726 as is described herein. In some embodiments, application 1722 may be arranged to operate with program data 1724 on operating system 1720 such that a schedule of a progressive recovery process, as a series of stages, of a system experience a large-scale disruption may be provided. This described basic configuration 1702 is illustrated in FIG. 17 by those components within the inner dashed line.

Computing device 1700 may have additional features or functionality, and additional interfaces to facilitate communications between basic configuration 1702 and any required devices and interfaces. For example, a bus/interface controller 1730 may be used to facilitate communications between basic configuration 1702 and one or more data storage devices 1732 via a storage interface bus 1734. Data storage devices 1732 may be removable storage devices 1736, non-removable storage devices 1738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1706, removable storage devices 1736 and non-removable storage devices 1738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1700. Any such computer storage media may be part of computing device 1700.

Computing device 1700 may also include an interface bus 1740 for facilitating communication from various interface devices (e.g., output devices 1742, peripheral interfaces 1744, and communication devices 1746) to basic configuration 1702 via bus/interface controller 1730. Example output devices 1742 include a graphics processing unit 1748 and an audio processing unit 1750, which may be configured to communicate to various external devices such as a display or speakers via one or more AN ports 1752. Example peripheral interfaces 1744 include a serial interface controller 1754 or a parallel interface controller 1756, which may be configured to communicate with external devices such as input devices (e.g., keyboard, mouse, pen, voice input device, touch input device, etc.) or other peripheral devices (e.g., printer, scanner, etc.) via one or more I/O ports 1758. An example communication device 1746 includes a network controller 1760, which may be arranged to facilitate communications with one or more other computing devices 1762 over a network communication link via one or more communication ports 1764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1700 may also be implemented as a personal computer including both laptop computer and non-laptop computer configurations.

The subject disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A method, comprising:
   identifying, a device comprising a processor, a subset of network links, of a set of network links of a communications network, having reduced capacity due to impairment;
   determining a set of resources available, for allocation at a given time, for repair of the subset of network links; and
   selecting a recovery sequence, from a set of recovery sequences, for the repair of the subset of network links, wherein the recovery sequences of the set differ based on respective selected amounts of traffic flow increase between the network links applicable to respective defined amounts of time after initiation of the respective recovery sequences,
   wherein the recovery sequence comprises a first sequence based on a first defined amount of traffic flow increase applicable to a first amount of time after the initiation of the recovery sequence and
   wherein the recovery sequence further comprises a second sequence based on a second defined amount of traffic flow increase applicable to a second amount of time after the initiation of the recovery sequence.

2. The method of claim 1, further comprising:
   determining, for the network link of the subset of network links, the repair cost, which represents an amount of resources from the set of resources to recuperate a defined capacity of the network link; and
   determining, based on the defined capacity of the network link, the amount of total capacity of the communications network regained by recuperating the defined capacity of the network link.

3. The method of claim 1, further comprising:
   assigning higher priority to the set of network links from the subset of network links having a higher utility gain.

4. The method of claim 1, wherein the first amount of time and the second amount of time are different.

5. The method of claim 1, wherein the first defined amount of traffic flow increase and the second defined amount of traffic flow increase are different.

6. A system, comprising:
   a processor that facilitates execution of executable modules, the executable modules comprising:
   a fault detection module configured to identify a disruption of a computing network, wherein the disruption results in reduced traffic flow capacity for a set of network nodes and a set of network links of the computing network; and
   a recovery module configured to select a recovery sequence, from a set of recovery sequences, for repair of a subset of the set of network links, wherein the recovery sequences of the set differ based on respective selected amounts of traffic flow increase between the network links applicable to respective defined amounts of time after initiation of the respective recovery sequences,
   wherein the recovery sequence comprises a first sequence based on a first defined amount of traffic flow increase applicable to a first amount of time after the initiation of the recovery sequence,
   wherein the recovery sequence further comprises a second sequence based on a second defined amount of traffic flow increase applicable to a second amount of time after the initiation of the recovery sequence,
   wherein the first amount of time and the second amount of time are different, and
   wherein the first defined amount of traffic flow increase and the second defined amount of traffic flow increase are different.

7. The system of claim 6, wherein the repair is facilitated via at least one of manpower, equipment, or parts available at a defined time.

8. The system of claim 6, wherein the recovery module is further configured to select the recovery sequence in accordance with an optimization condition.

9. The system of claim 8, wherein the optimization condition specifies a total traffic flow capacity of the computing network.

10. The system of claim 6, wherein the recovery module is further configured to:

determine, for the network link of the subset of network links, the repair cost, which represents an amount of resources from the set of resources to recuperate a defined capacity of the network link.

11. The system of claim 10, wherein the recovery module is further configured to:
determine, based on the defined capacity of the network link, the amount of total capacity of the communications network regained by recuperating the defined capacity of the network link.

12. The system of claim 6, wherein the recovery module is further configured to:
assign higher priority to the set of network links from the subset of network links having a higher utility gain.

13. A non-transitory computer-readable storage medium having stored thereon computer-executable instructions that, in response to execution, cause a device to perform operations, comprising:
identifying a subset of network links, of a set of network links of a communications network, having reduced capacity due to impairment;
determining a set of resources available, for allocation at a given time, for repair of the subset of network links; and
selecting a recovery sequence, from a set of recovery sequences, for the repair of the subset of network links, wherein the recovery sequences of the set differ based on respective selected amounts of traffic flow increase between the network links applicable to respective defined amounts of time after commencement of the respective recovery sequences,
wherein the recovery sequence comprises a first sequence based on a first defined amount of traffic flow increase applicable to a first amount of time after the commencement of the recovery sequence, and
wherein the recovery sequence further comprises a second sequence based on a second defined amount of traffic flow increase applicable to a second amount of time after the commencement of the recovery sequence.

14. The non-transitory computer-readable storage medium of claim 13, wherein the
identifying comprises identifying the subset of network links having reduced capacity based upon a set of designed capacities respectively corresponding to the subset of network links having reduced capacity and a set of measured capacities respectively corresponding to the subset of network links having reduced capacity.

15. The non-transitory computer-readable storage medium of claim 13, wherein the operations further comprise:
determining a total weighted traffic flow capacity as a function of,
a set of weights assigned to respective network links of the subset of disrupted network links having reduced capacity, wherein respective weights of the set of weights correspond to respective stages of the recovery sequence.

16. The non-transitory computer-readable storage medium of claim 13, wherein the operations further comprise:
determining, for the network link of the subset of network links, the repair cost, which represents an amount of resources from the set of resources to recuperate a defined capacity of the network link.

17. The non-transitory computer-readable storage medium of claim 16, wherein the operations further comprise:
determining, based on the defined capacity of the network link, the amount of total capacity of the communications network regained by recuperating the defined capacity of the network link.

18. The non-transitory computer-readable storage medium of claim 13, wherein the operations further comprise:
assigning higher priority to the set of network links from the subset of network links having a higher utility gain.

19. A system, comprising:
means for detecting a subset of network links, of a communications network, exhibiting reduced traffic flow capacity due to a disruption;
means for determining a set of resources available, for allocation at a given time, for repair of the subset of network links; and
means for selecting a recovery sequence, from a set of recovery sequences, for the repair of the subset of network links, wherein recovery sequences of the set differ based on respective selected amounts of traffic flow increase between the network links applicable to respective defined amounts of time after commencement of the respective recovery sequences,
wherein the recovery sequence comprises a first sequence based on a first defined amount of traffic flow increase applicable to a first amount of time after the commencement of the recovery sequence, and
wherein the recovery sequence further comprises a second sequence based on a second defined amount of traffic flow increase applicable to a second amount of time after the commencement of the recovery sequence.

20. The system of claim 19, further comprising means for determining, for the network link of the subset of network links, the repair cost, which represents an amount of resources from the set of resources to recuperate a defined capacity of the network link.

* * * * *